United States Patent
Guevokian et al.

(10) Patent No.: US 7,536,430 B2
(45) Date of Patent: May 19, 2009

(54) METHOD AND SYSTEM FOR PERFORMING CALCULATION OPERATIONS AND A DEVICE

(75) Inventors: David Guevokian, Tampere (FI); Aki Launiainen, Tampere (FI); Petri Liuha, Tampere (FI)

(73) Assignee: Nokia Corporation, Espoo (FI)

( * ) Notice: Subject to any disclaimer, the term of this patent is extended or adjusted under 35 U.S.C. 154(b) by 550 days.

(21) Appl. No.: 10/703,161

(22) Filed: Nov. 6, 2003

(65) Prior Publication Data

US 2004/0139131 A1 Jul. 15, 2004

(30) Foreign Application Priority Data

Nov. 6, 2002 (FI) .................................. 20021984

(51) Int. Cl.
*G06F 7/523* (2006.01)
(52) U.S. Cl. ..................................................... 708/631
(58) Field of Classification Search .................. 708/631
See application file for complete search history.

(56) References Cited

U.S. PATENT DOCUMENTS

| | | | |
|---|---|---|---|
| 3,732,410 A * | 5/1973 | Mackechnie | 708/322 |
| 5,220,525 A * | 6/1993 | Anderson et al. | 708/631 |
| 5,594,679 A * | 1/1997 | Iwata | 708/521 |
| 5,935,202 A | 8/1999 | Frederick, Jr. | |
| 6,052,706 A * | 4/2000 | Wheeler et al. | 708/631 |
| 6,085,214 A * | 7/2000 | De Angel | 708/628 |
| 6,141,674 A | 10/2000 | Unkrich et al. | |
| 6,311,203 B1 | 10/2001 | Wada et al. | |
| 6,353,843 B1 * | 3/2002 | Chehrazi et al. | 708/631 |
| 6,367,003 B1 | 4/2002 | Davis | |
| 7,127,482 B2 * | 10/2006 | Hou et al. | 708/402 |

FOREIGN PATENT DOCUMENTS

| | | |
|---|---|---|
| EP | 0644492 | 3/1995 |
| EP | 1050828 | 11/2000 |

OTHER PUBLICATIONS

M. R. Santoro and M. A. Harowitz, "*SPIM: A Pipelined 64×64-bit Iterative Multiplier,*" IEEE Journal of Solid-state Circuits, vol. 24, No. 2, New York, NY, Apr. 1989.

* cited by examiner

*Primary Examiner*—David H Malzahn

(57) ABSTRACT

A method for performing calculation operations uses a pipelined calculation device comprising a group of at least two pipeline stages, at least one data interface for input of data, and at least one data interface for output of data. The pipeline stages include at least one data interface for input of data and at least one data interface for output of data. Data for performing a first and a second calculation operation is input to the device. In the first calculation operation, output data of at least one pipeline stage is stored into a memory. In the second calculation operation the stored data is used as input data to a pipeline stage. The invention further relates to a system and a device, in which the method is utilized.

30 Claims, 13 Drawing Sheets

METHOD AND SYSTEM FOR PERFORMING CALCULATION OPERATIONS AND A DEVICE

CROSS-REFERENCE TO RELATED APPLICATION

Figure 1:
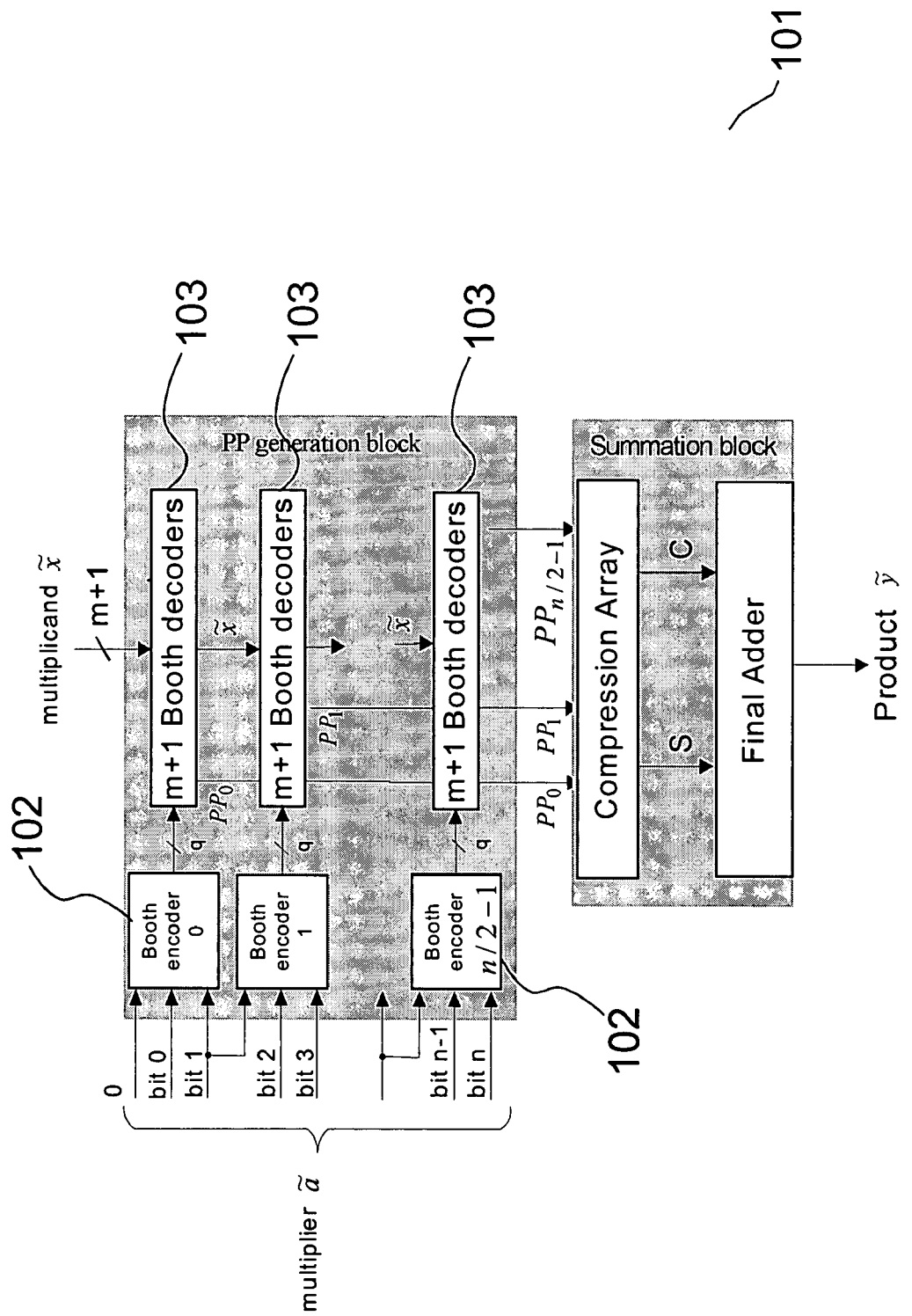

Priority is claimed under 35 U.S.C. § 119 from Finnish application FI 20021984 filed Nov. 6, 2002.

BACKGROUND OF THE INVENTION

1. Technical Field

The present invention relates to a method for performing calculation operations using a pipelined calculation device comprising a group of at least two pipeline stages, at least one data interface for input of data, and at least one data interface for output of data, said pipeline stages having at least one data interface for input of data and at least one data interface for output of data, in which method data for performing a first and a second calculation operation is input to the device. The invention also relates to a device and a system for performing the method.

2. Discussion of Related Art

There are many applications in which multiplication, multiply-accumulate (MAC) and other calculation operations are needed. As a non-restrictive example many signal processing applications, such as digital signal filtering applications, video/image processing applications etc., are applications in which real time multiplication operations are implemented. Also other applications in which vector and/or matrix operations are needed use multiplication and MAC operations. Multiplication operations are normally implemented as summation and bit-wise shifting operations. Such multiplication operations are resource demanding tasks because one multiplication operation between two operands needs many summation and shifting operations to calculate the multiplication result.

Specific to video/image processing algorithms is the vast amount of computations that have to be implemented in real time. Therefore, the high-speed performance has been the driving force in developing parallel specialized structures (accelerators) for different video/image processing algorithms or subtasks. A prior art video/image processing system involves several such accelerators (e.g. Sum of Absolute Differences (SAD), cosine transform, etc.) each being composed of large amount of hardware elements. However, with developing mobile communication systems, the hardware area, which affects to the costs of the system, and the power/energy consumption are as important properties as the high-speed performance. One way towards satisfying all these criteria is further modernization of Digital Signal Processors (DSPs) and reduction of the number of specialized accelerators. Although some improvements exist on this area the developed systems still does not always meet the high-speed and power consumption requirements.

Table 1 summarizes some core arithmetic patterns along with examples of video/image processing algorithms where these patterns are frequently implemented. Operations involved in these patterns are very basic ones and are very familiar. A vast amount of the literature is devoted to their implementations. Here two specifics are emphasized concerning these operations in the video/image processing context. First, operands of operations are most often medium (8- to 16-bit) precision integers. Secondly, most of the algorithms use massively parallel operations. In some cases these parallel operations share the same operands. For example, in a scalar quantization, the same number is multiplied to many pixels of the image, in a matrix-vector product different rows of the matrix are multiplied to the same input vector, in Finite Impulse Response (FIR) filtering the same coefficients are involved in a number of MAC operations, etc.

TABLE 1

| Arithmetic pattern | Description | Algorithms |
| --- | --- | --- |
| Parallel additions/ subtractions | $d_i = a_i \pm b_i,$ $i = 1, \ldots, k$ | Motion compensation, luminance changing, suboperation in DCT, DWT, SAD, etc. |
| Accumulation | $s = \sum_{i=1}^{K} a_i$ | Averaging filter in pre- and post-processing, suboperation in DWT, vector-vector and matrix-vector inner products, convolution, etc. |
| Parallel multiplications | $m_i = a_i x_i$ or $m_i = a_i x,$ $i = 1, \ldots, K$ | Quantization, suboperation in DCT, DWT, vector-vector and matrix-vector inner products, convolution, etc. |
| Multiply-accumulate (MAC) | $s_i = s_{i-1} + a_i x_i,$ $i = 1, \ldots, K,$ $s_0$ is a known integer | Basic operation in FIR filtering and matrix-vector operations. |
| Vector-vector inner product | $s = \sum_{i=1}^{K} a_i x_i$ | Pre- and post-processing, suboperation in DCT, DWT, vector-vector and matrix-vector inner products, convolution, etc. |
| Matrix-vector product | $s_i = \sum_{j=1}^{P} a_{i,j} x_j$ $i = 1, \ldots, K$ | Color conversions, geometric manipulations, affine motion estimation, Pre- and post-processing, suboperation in DCT, etc. |

TABLE 1-continued

| Arithmetic pattern | Description | Algorithms |
| --- | --- | --- |
| FIR filtering (convolution) | $s_i = \sum_{j=1}^{P} a_j x_{i-j}$<br>$i = 1, \ldots, K$ | Pre- and Postprocessing (image filtering enhancement, interpolation, extrapolation), basic operation of DWT |
| SAD (sum of absolute differences) | $s = \sum_{i=1}^{K} |a_i - b_i|,$ | Motion estimation, an image fidelity criterium MAE |

The prior art architectures for video and image processing and other signal processing tasks are usually based on conventional multiplier structures. Many multiplication methods and a very large variety of devices for implementing multiplication and/or multiply-accumulate operations have been developed. In the following, only multiplication methods and general multiplier structures for the case where both the operands (the multiplicand and the multiplier) are unknown, multiplication of two fixed-point signed integers presented in two's complement arithmetic, and the so called radix-T methods will be considered.

The two's complement representation of the n-bit (including the sign) multiplier a will be denoted as $\tilde{a}=a_{n-1}a_{n-2} \ldots a_1 a_0$, and the two's complement representation of the m-bit (including the sign) multiplicand x will be denoted as $\tilde{x}=x_{m-1}x_{m-2}\ldots x_1 x_0$, respectively. The relation between a and $\tilde{a}$ (and a similar relation between x and $\tilde{x}$) is as follows:

$$a = -a_{n-1}2^{n-1} + \sum_{r=0}^{n-2} a_r 2^r, \quad x = -x_{m-1}2^{m-1} + \sum_{l=0}^{m-2} x_l 2^l. \quad (1)$$

In a radix-T parallel multiplication method the two's complement $\tilde{y}=y_{m+n-1}y_{m+n-2}\ldots y_1 y_0$ of the product $y=a \cdot x$ is obtained according to the formula $$\tilde{y} = \sum_{r=0}^{n_{radix-T}-1} (A_r x) 2^{rt_{radix-T}} \quad (2)$$

in the following two main steps:
Step 1. Generation of partial products (PP) $A_r \cdot x$, $r=0, \ldots, n_{radix-T}-1$ such that Equation (2) is valid.
Step 2. Summing up in parallel all the partial products preliminary shifting the rth partial product $A_r \cdot x$, $r=0, \ldots, n_{radix-T}-1$ for $rt_{radix-T}$ positions to the left.

A radix-T MAC unit operates in a similar way with the difference that another number (accumulating term) is added along with partial products at the Step 2.

The Step 1 will now be considered in more detail. Depending on how the numbers $A_r \cdot x$, $r=0, \ldots, n_{radix-T}-1$ are defined and obtained, different multiplication methods can be derived. In turn, the choice of the numbers $A_r \cdot x$, $r=0, \ldots, n_{radix-T}-1$ is, in fact, dictated by representation of the multiplier a. The simplest multiplication method is a radix-2 method, which uses the basic two's complement representation of a given in the left equation of (1). In this case, the two's complement of the product will be obtained as:

$$\tilde{y} = \sum_{r=0}^{n_{radix-2}-1} (A_r x) 2^{rt_{radix-2}} = \sum_{r=0}^{n-2} (a_r x) 2^r - (a_{n-1} x) 2^{n-1}, \quad (3)$$

that is, $n_{radix-2}=n$, and the partial products $A_r \cdot x$, $r=0, \ldots, n-1$ are defined by $A_r=a_r$ for $r=0, \ldots, n-2$, and $A_{n-1}=-a_{n-1}$ for $r=n-1$. These partial products may simply be (and are usually) formed using an array of 2-input AND gates between every two's complement bit of the multiplier $\tilde{a}$ and the multiplicand $\tilde{x}$. The value of $A_r \cdot x$, $r=0, \ldots, n-1$ is multiplied to $2^r$ (i.e. is shifted to the left for r positions) before being accumulated at the second step. It should be noted that in this method the partial product $A_{n-1} \cdot x$, which sometimes is also called a correction factor, is treated differently from the other partial products.

The non-uniform nature of the partial products is avoided in another radix-2 multiplication method based on Booth recoding of the two's complement bits $\tilde{a}$ of the multiplier into redundant signed digit numbers. The product can now be presented as:

$$\tilde{y} = \sum_{r=0}^{n_{radix-2}-1} (A_r x) 2^r = \sum_{r=0}^{n-1} (-a_r + a_{r-1}) x 2^r, \quad a_{-1} = 0 \quad (4)$$

That is, $n_{radix-2}=n$, as before but the partial products $A_r \cdot x$, $r=0, \ldots, n-1$ are all now defined by $A_r=-a_r+a_{r-1}$. Similarly to the previous method, the value of $A_r \cdot x$, $r=0, \ldots, n-1$, is multiplied to $2^r$ before being added at the second step. In this scheme the partial products are selected among $0, \pm x$. The two of these values (0 and x) are readily available while finding $-x$ requires inverting the bits of $\tilde{x}$ and adding unity. Normally, addition of unity is performed in the Step 2 where the partial products are summed.

There are totally $n_{radix-2}=n$ partial products to be summed in a radix-2 multiplication method irrespective of if the Booth recoded or non-recoded method is used. In order to reduce the number of partial products and, hence, the delay of the second stage (summing up partial products), the radix-4 Modified Booth Algorithm (MBA) based method has been developed. The MBA is one of the most popular multiplication methods and is being extensively studied and optimized.

In order to simplify the formulae below, in every case where a term like n/k occurs, it is assumed that n is an integer multiple of k. This is a valid assumption since a two's complement number may be complemented with an arbitrary number of bits (repeating the most significant bit).

In MBA, the two's complement of the product is obtained as the sum $$\tilde{y} = \sum_{r=0}^{n_{radix-4}-1} (A_r x) 2^{2r} = \sum_{r=0}^{n/2-1} ([-2a_{2r+1} + a_{2r} + a_{2r-1}]x) 2^{2r}, \ a_{-1} = 0 \quad (5)$$

of $n_{radix-4}=n/2$ partial products, where the value of $A_r \in \{-2,-1,0,1,2\}$, $r=0, 1, \ldots, n/2-1$, is chosen according to three consecutive bits $a_{2r+1}, a_{2r}, a_{2r-1}$ ($a_{-1}=0$) of the two's complement representation of the multiplier $\tilde{a}$. The partial product $A_r x$, $r=0, 1, \ldots, n/2-1$, is multiplied by $2^{2r}$ (i.e. hardware shifted to the left for $2r$ positions) before being added at the Step 2.

It is also possible to use radices higher than 2 with non-recoded multiplication methods for reducing the number of partial products. For example, in radix-4 non-recoded multiplication method the partial products $A_r x$, $A_r \in \{0,1,2,3\}$, $r=0, 1, \ldots, n/2-1$ are chosen according to two consecutive bits $a_{2r+1}, a_{2r}$ of the multiplier. There are $n_{radix-4}=n/2$ partial products in this method. The potential partial product $2x$ can be generated by shifting potential partial product $x$ once to the left. The odd partial product $3x$ needs an additional summation of $x$. If multiplications of negative numbers are also used, the sign extension must be used, in which the most significant bit (i.e. the sign bit) of each partial product is copied as many times as is necessary to achieve the required bit-length.

In radix-8 non-recoded multiplication method the partial products $A_r x$ $A_r \in \{0,1,2,3,4,5,6,7\}$, $r=0, 1, \ldots, n/3-1$, are chosen according to three consecutive bits of the multiplier. The list of potential partial products is $0, x, 2x, 3x, \ldots, 7x$ all of which become available by implementing three independent additions/subtractions in order to obtain $3x=x+2x$, $5x=x+4x$, $7x=8x-x$. The potential partial product $6x$ can be formed by shifting the potential partial product $3x$ one position to the left. For the cases of higher radices (>=16), however, there are some potential partial products (e.g. 11x and 13x) that cannot be obtained in one addition/subtraction.

FIG. 1 presents a general device 101 for performing the Modified Booth Algorithm. There are $n/2$ Booth encoding-decoding rows, each row comprises a Booth encoder 102, and $m+1$ Booth decoders 103, which may be grouped by two. Every Booth encoder 102 analyzes three consecutive bits of the two's complement of the multiplier $\tilde{a}$, with an overlap of one bit, and outputs q signals to the corresponding row of decoders 103. In some recent prior art designs the value of $q=3$. According to these q-signals the decoder rows form the partial products $(A_r x) \in \{0, \pm x, \pm 2x\}$ having the bits $\tilde{x}$ of the multiplicand at their inputs. The nonnegative multiples of $x$ are readily available since $2x$ is formed by a hardwired shift. The negative multiples of $x$ are formed by inverting the bits of the corresponding positive multiples of $x$ and then adding 1 which is usually performed at the Step 2. For example, U.S. Pat. No. 6,173,304 describes such a system implementing the Booth encoders and decoders. In the radix-2 method the partial products can be found easier than in the Modified Booth Algorithm but the number of the partial products is reduced to $n/2$ when the Modified Booth Algorithm is used which leads to significant advantages in speed performance, area, and power consumption.

In order to further reduce the number of partial products, the Booth encoding has further been extended to multibit (arbitrary radix-T) recoding. The general equation for the product is now given as:

$$\tilde{y} = \sum_{r=0}^{n_{radix-T}-1} (A_r x) 2^{rt} = \sum_{r=0}^{n/t-1} \left( \left[ -a_{tr+t-1} 2^{t-1} + \sum_{i=0}^{t-2} a_{tr+i} 2^i + a_{tr-1} \right] x \right) 2^{tr} \quad (6)$$

$$a_{-1} = 0, \ T = 2^t = 2^{t_{radix-T}}.$$

That is, there are $n_{radix-T}=n/t$ partial products ($T=2^t$) and every partial product is selected according to $t+1$ consecutive bits of the multiplier $\tilde{a}$ from the list of potential partial products $Ax$ with $A$ ranging between $-2^{t-1}$ and $2^{t-1}$. Every potential partial product may be relatively easily formed by addition of two (for $T=8,16$) or more (for $T>16$) power-of-2 multiples of $x$, and, possibly, inversion of the bits followed by addition of 1 (at Step 2). For example, in the case of radix-8 recoding, the list of potential partial products is $0, \pm x, \pm 2x, \pm 3x, \pm 4x$. All the nonnegative multiples from this list are readily available except for $3x$ which may be obtained in one addition: $3x=x+2x$. Negative multiples may be found by invert-add-1 method, as before. In the case of radix-16 recoding, the list of potential partial products is $0, \pm x, \pm 2x, \pm 3x, \ldots, \pm 8x$ all of which become available by implementing three independent additions/subtractions in order to obtain $3x=x+2x$, $5x=x+4x$, $7x=-x+8x$. The potential partial product $6x$ can be formed by shifting the potential partial product $3x$ one position to the left. For the cases of higher radices, however, there are some potential partial products (e.g. 11x and 13x) that cannot be obtained in one addition/subtraction.

Figure 2:
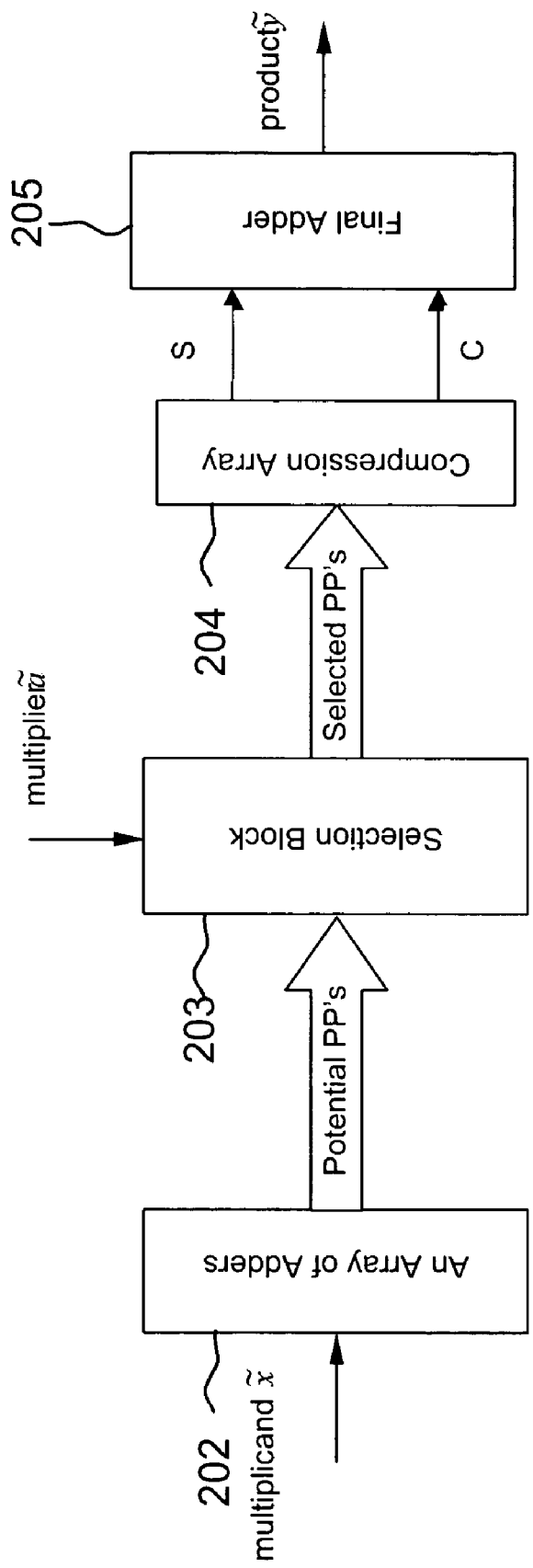

FIG. 2 presents the general structure 201 of prior art radix-T ($T \geq 8$) multibit Booth recoded and radix-T ($T \geq 4$) new non-recoded ("radix-higher-than-four") multipliers. This structure comprises an array of adders 202 for computing the list of potential partial products $0, \pm x, \pm 2x, \ldots, \pm Tx$, a selection block 203 for selecting $n/t$ partial products according to the multiplier bits, and a summation block 204 for summing up the selected partial products. The final adder 205 forms the product $\tilde{y}$ from sum S and carry C terms produced by the summation block 204.

The array of adders of a typical prior art radix-higher-than-four multiplier comprises s adders/subtractors, where s is the number of odd positive multiples of $x$ involved in the list of potential partial products ($s=1$ in the cases of $T=8$ Booth recoded and $T=4$ non-recoded multipliers, and $s=3$ in the cases of $T=16$ Booth recoded or $T=8$ non-recoded multipliers, etc.). Usually, fast carry-look-ahead (CLA) adders are used since forming the list of potential partial products is rather time consuming part of such multipliers. In a patent U.S. Pat. No. 5,875,125 a special $x+2x$ adder has been proposed which may be used in radix-8 multipliers. It should be noted that mixed radix-4/8 multipliers have also been proposed, for example in U.S. Pat. No. 4,965,762, which, however, are mainly useful for iterative (not parallel) multipliers where the partial products are generated and accumulated serially. U.S. Pat. No. 5,646,877 describes a multiplier structure where all the potential partial products for an arbitrary radix are obtained as sums or differences of shifted versions of $3x$ and of $x$ within the array of adders comprises an $x+2x$ adder for generating $3x$, two shifters and an adder/subtracter.

The selection block of a typical prior art radix-higher-than-four multiplier comprises n/t radix-T Booth encoders and equal number of decoder rows. Each encoder analyzes the corresponding (t+1)-tuple of the multiplier and outputs a plurality of control signals according to which the corresponding partial products are formed by the decoder rows. Remarks on how to extend the radix-4 Booth encoders and decoders to higher radices are given, for example, in a patent U.S. Pat. No. 6,240,438.

In the following, the summing up the partial products, i.e. the Step 2, will be considered in more detail. Most of the parallel multiplier/MAC unit structures use summation blocks composed of a compression array followed by a fast adder (final adder) for summing up the partial products formed at Step 1 (see FIGS. 1 and 2). The compression array reduces the $n_{radix-T}$ partial product rows to two rows corresponding to sum S and carry C terms that are added with the final adder. The compression array is usually composed of either full and half adders (a carry-save-adder-tree or a Wallace tree) or 4:2 compressors. The final adder is usually a fast carry-look-ahead adder, which is carefully designed according to the delays of different bits from the compression array.

It should be noted that, if a Booth recoding scheme is utilized, then, as a result of performing the unity addition in Step 2 instead of in Step 1, every partial product row is accompanied with a one-bit value, which is zero if the partial product is a nonnegative multiple of the multiplicand and is unity otherwise. Thus, actually, the number of rows is $2n_{radix-T}$. Even though these one-bit values may be merged into partial product rows in such a way that the number of rows is again $n_{radix-T}$ or maybe $n_{radix-T}+1$ but with the price of increasing the length of partial product rows (by one bit) and making them irregular. In a non-recoded scheme, there is at most one extra one-bit value so simpler compression arrays can be designed.

Another problem associated with the summation block in a Booth recoded multiplier is how to handle sign extensions since the partial product rows are shifted with respect to each other before adding them. In a straightforward implementation every partial product (after shifting) should have been extended to a (n+m)-bit number, which is very wasteful approach. Special sign extension methods and circuits have been developed to reduce the number of sign extended bits to two in every row. In the case of non-recoded multipliers, sign extensions may be handled easier, with no extra sign bits, since all but possibly one partial products are of the same sign.

Figure 3A:
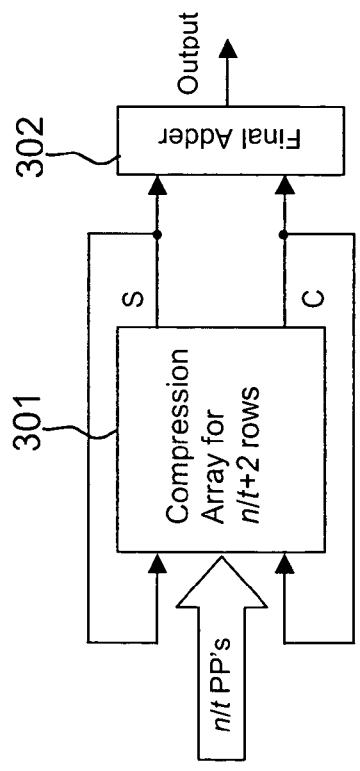
Figure 3B:
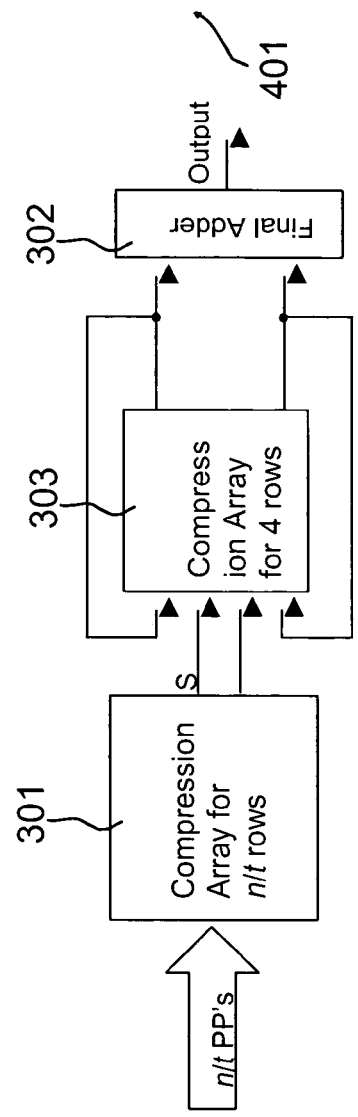

There are principally two ways of extending multiplier structures to MAC units as depicted in FIGS. 3a and 3b. In the first case (FIG. 3a), the two outputs (the sum S and carry C terms) of the compression array 301 are fed back to its inputs so that the current partial product values are accumulated with the two addends of the current accumulation value. The final sum S and carry C terms are then added within the final adder 302. In the second case (FIG. 3b) these outputs are fed to another compression array 303 outputs of which are fed back to its (the second compression array 303) input. Now, the sum S and the carry C terms of the current product are accumulated to the current accumulation value until the last cycle when the final sum S and carry C terms are added within the final adder 302. The depth (and, therefore, the overall delay) of the whole compression array may be smaller in the first case while the width and, therefore, the area and power consumption may be smaller in the second case.

As a summary of high-radix multipliers, it should be noted that the higher the radix the higher the complexity of the Step 1 (generating partial products) but lower the complexity of the Step 2 (summing up partial products). The "radix-higher-than-four" multiplication methods have not gained popularity, perhaps due to the necessity of having rather time and area consuming partial product generators, including both the array of adders and the selection block. Commonly, the radix-4 MBA is considered the best prior art parallel multiplication method and is used in many industrial multipliers.

A method called pipelining can be used in connection with calculation operations. Hence, a device utilizing pipelining comprises two or more pipeline stages. Each pipeline stage is intended to perform a certain part or parts of calculation operations (i.e. sub-operations). In the prior art the calculation operations of the pipeline stages relate to each other so that each pipeline stage performs one or more sub-operations of the calculation operation to be performed, and the output of the last pipeline stage provides the result of the calculation operation. In such a device different pipeline stages operate in succession, where the next pipeline stage begins the calculation of the sub-operation after the previous pipeline stage has finished the calculation of its sub-operation. If pipeline stages are poorly balanced (i.e. some stages are significantly faster than the others), this means that all but one pipeline stage is waiting or is in an idle state most of the time. Furthermore, all the pipeline stages are reserved for a certain task (calculation of a certain sub-operation) and they cannot be used for performing other calculation operations.

In the following, some multiplier/MAC unit features, which are desired from a video and image processing point of view but are absent or weak in prior art solutions, will be presented. First, the most popular radix-4 Booth recoded multiplier/MAC method will be considered. As a general drawback of this method it is more power consuming than higher radix methods. Another general drawback is that, even though the number of partial products is reduced to half compared to radix-2 multiplication, it still could be reduced using higher radices. That is, the complexity of this method is mainly concentrated in the Step 2 (summing up partial products). When pipelining a radix-4 Booth-recoded multiplier/MAC structure, usually the partial product generation block is considered as the first pipeline stage which, however, is poorly balanced with (i.e. faster than) the other pipeline stages.

Considering the "radix-higher-than-four" Booth recoded multipliers, it has been shown that different realizations of these multipliers, when considered for implementation of only the multiplication operation, perform competitively to the radix-4 multipliers with respect to the area and time criteria while outperforming those with respect to the power consumption. The main drawback of the "radix-higher-than-four" methods is the necessity of having an array of adders at the partial product generation block.

The Booth recoded "radix-higher-than-four" multipliers also have a drawback related to the necessity of handling the negative multiples of the multiplicand as well as the sign extensions.

A radix-T non-recoded multiplier involves the same number of adders in the potential partial product generation block as the radix-(2T) Booth recoded one. When "radix-higher-than-eight" non-recoded or "radix-higher-than-sixteen" Booth recoded multipliers are used, more than one-level addition is needed to generate potential partial products.

TABLE 2a

| Multiplier Type | | BR, T=4 | BR, T=8 | BR, T=16 |
|---|---|---|---|---|
| AA width, s | | — | 1 | 3 |
| # of potential PPs | | 5 | 9 | 17 |
| Components of the SB | Encod. | n/2 BR4 | n/3 BR8 | n/4 BR16 |
|  | Decod. | n/2 (m+1)–BD4 | n/3 (m+2)–4:1 t/c | n/4 (m+3)–8:1 t/c |
|  | SE | Yes | Yes | Yes |
| Delay of the SB | | 6t | 12t | 16t |
| # of inputs to CA | | N/2 (m+1)-bit+3n/2 1-bit | n/3 (m+2)-bit+4n/3 1-bit | n/4 (m+3)-bit+5n/4 1-bit |
| # of inputs/ levels/delay of the FA-CA | n=13, x | 7/4/8t | 5/3/6t | 4/2/4t |
|  | MAC | 9/5/10t | 8/4/8t | 6/3/6t |
|  | n=16, x | 8/4/8t | 6/3/6t | 4/2/4t |
|  | MAC | 10/5/10t | 8/4/8t | 6/3/6t |
|  | n=64, x | 32/8/16t | 22/7/14t | 16/6/12t |
|  | MAC | 34/9/18t | 24/7/14t | 18/6/12t |
| # of inputs/ levels/delay of the 4:2-CA | n=13, x | 7/2/6t | 5/(4:2)+FA/5t | 4/1/3t |
|  | MAC | 9/2(4:2)+FA/8t | 7/2/6t | 6/2/6t |
|  | n=16, x | 8/2/6t | 6/2/6t | 4/1/3t |
|  | MAC | 10/3/9t | 8/2/6t | 6/2/6t |
|  | n=64, x | 32/4/12t | 22/4/12t | 16/3/9t |
|  | MAC | 34/5/15t | 24/4/12t | 18/4/12t |

TABLE 2b

| Multiplier Type | | NR1, T=4 | NR1, T=8 | NR2, T=4 | NR2, T=8 |
|---|---|---|---|---|---|
| AA width, s | | 2 | 4 | 1 | 3 |
| # of potential PPs | | 4 | 8 | 4 | 8 |
| Components of the SB | Encod. | No | No | 1 BR4 | 1 BR8 |
|  | Decod. | n/2 (m+1)–4:1 | n/3 (m+2)–8:1 | (m+1)–(BD4+n/2(4:1)) | (m+2)(4:1 t/c+n/3(8:1)) |
|  | SE | No | No | No | No |
| Delay of the SB | | 5t | 6t | 6t | 12t |
| # of inputs to CA | | ((n−1)/2+1) (m+2)-bit | ((n−1)/3+1) (m+3)-bit | (n−1)/2 (m+4)-bit+1 1-bit | (n−1)/3 (m+6)-bit+1 1-bit |
| # of inputs/ levels/ delay of the FA-CA | n=13, x | 7/4/8t | 5/3/6t | 6/3/6t | 4/2/4t |
|  | MAC | 9/4/8t | 7/4/8t | 8/4/8t | 6/3/6t |
|  | n=16, x | 9/4/8t | 6/3/6t | 8/4/8t | 5/3/6t |
|  | MAC | 11/5/10t | 8/4/8t | 10/5/10t | 7/4/8t |
|  | n=64, x | 33/8/16t | 22/7/14t | 32/8/16t | 21/7/14t |
|  | MAC | 35/9/18t | 24/7/14t | 34/9/18t | 23/8/16t |
| # of inputs/ levels/ delay of the 4:2-CA | n=13, x | 7/2/6t | 5/(4:2)+FA/5t | 6/2/6t | 4/1/3t |
|  | MAC | 9/2(4:2)+FA/8t | 7/2/6t | 8/2/6t | 6/2/6t |
|  | n=16, x | 9/2(4:2)+FA/8t | 6/2/6t | 8/2/6t | 5/(4:2)+FA/5t |
|  | MAC | 11/3/9t | 8/2/6t | 10/3/9t | 7/2/6t |
|  | n=64, x | 33/4(4:2)+FA/14t | 22/4/12t | 32/4/12t | 21/4/12t |
|  | MAC | 35/5/15t | 24/4/12t | 34/5/15t | 23/4/12t |

TABLE 2c

| | |
|---|---|
| BR | Booth recoded radix-T multiplier |
| NR1 | Non-recoded radix-T multiplier of type 1 |
| NR2 | Non-recoded radix-T multiplier of type 2 |
| SE | Sign extension circuitry |
| BR4, BR8, BR16 | Booth recoder circuitries for the corresponding radix |
| BD4 | Radix-4 Booth decoder circuitry |
| 4:1, 8:1, 4:1 t/c, 8:1 t/c | Multiplexers or true/complement multiplexers with corresponding number of inputs. |
| SB | Selection Block |
| CA, FA-CA, 4:2 CA | Compression array, CA composed of Full (FA) and Half Adders (HA), CA composed of 4::2 compressors |

Table 2a presents various characteristics of different blocks used in prior art Booth recoded radix-T multipliers/MAC units for multiplying an n-bit multiplier and an m-bit multiplicand, and Table 2b presents various characteristics of different blocks used in new Non-recoded radix-T multipliers/MAC units for multiplying an n-bit multiplier and an m-bit multiplicand, and Table 2b presents various characteristics of different blocks used in prior art Non-recoded radix-T multipliers for multiplying an n-bit multiplier and an m-bit multiplicand, respectively. Table 2c presents the acronyms utilized in Tables 2a and 2b. Analyzing Tables 2a and 2b, one can see that there are essential differences in the delays of different blocks of every multiplier in every multiplier/MAC unit type for most of the values of n and m. That is, a direct pipelined realization of these multipliers would suffer from poor balancing between pipeline stages. Trying to achieve better balancing between these pipeline stages, one could flexibly increase the throughputs of the first and the last pipeline stages by designing carry-look-ahead (CLA) adders with different numbers of FAs within one carry-ripple block. This is why the delays of these blocks are not indicated in Tables 2a and 2b. In some cases, e.g. small n, higher radix T, this may mean very small carry-ripple blocks, and therefore large area. Anyhow, using CLAs may be a solution for speeding up these two stages, though this solution is not the most efficient. The situation is different for the middle two pipeline stages (the SB and the CA) since the state-of-the-art circuits for these blocks are designed by optimizing critical paths in such a way that internal pipelining of these circuits would not be reasonable. Moreover, relative differences between the delays of these blocks are very different for every type (BR (T=8,16), NR1 (T=4,8)) of prior art multiplier/MAC unit structures for different values of n. For the cases of smaller n and higher radix T (e.g., T=16 and arbitrary n) the Selection Block is slower than the Compression Array while in other cases the situation is the opposite. This means that designing faster circuits for one or another block will not give a general solution to the problem of balancing these stages. All of these make it difficult to derive a systematic method for pipelining prior art multiplier/MAC structures with well-balanced pipeline stages.

On the other hand, if a parallel array of independent prior art multipliers/MAC units were to be employed to implement a plurality of corresponding operations, a large silicon area would be required even though the faster blocks could be shared without affecting overall throughput. In addition, as illustrated above, the pipeline stages would be poorly balanced if pipelined multipliers/MAC units were to be employed in such an array.

Prior art parallel architectures for matrix-vector arithmetic are designed so that they use a plurality of independent multipliers combined with adders or a plurality of independent MAC units. It is also usual to have a plurality of specific circuits for different kind of arithmetic operations. However, high radix multipliers include blocks (pipeline stages) that may be reused for other operations such as additions/subtractions, accumulations, etc. It should also be mentioned that, in matrix vector arithmetics, especially those used in video/image processing, there are many situations where one multiplicand is to be multiplied with several multipliers meaning that potential partial products of the multiplicand could have been reused in all of these multiplications if high-radix multiplication methods would be used. For example, in vector and matrix calculation operations, in which the same multiplier will be used for many times, the same partial products will be used more than once during the calculation. When such calculation operations are implemented in prior art architectures, they calculate the partial products each time they are needed, leading to inefficient utilization of hardware resources and additional power consumption. In addition, as was mentioned above, there are many situations in which pipeline stages of prior art multipliers are poorly balanced thus reducing the efficiency of the device.

OBJECTIVES AND SUMMARY OF THE INVENTION

An aim of the present invention is to implement an improved calculation structure and method for performing calculation operations with the capability to store intermediate results of the calculation operations, especially the capability to store potential partial products of a multiplication operation. In the method according to the present invention output data of at least one calculation stage in an operation, e.g., a pipeline stage is stored into a memory, wherein the stored data is used as input data with another calculation operation. In addition to storing the potential partial products, the memory of the calculation device can be used with many calculation operations. An advantageous embodiment of the calculation device according to the present invention is multifunctional/configurable to several different structures by a set of control signals. The structures of the present invention can advantageously be implemented as a VLSI architecture.

There are different embodiments of the present invention some of which will be illustrated in more detail later in this description.

In the first embodiment, a memory unit is utilized in which the potential partial products can be stored and reused in those cases where the same multiplicand is to be multiplied to a number of multipliers. Non-limiting examples of such operations are matrix-vector multiplication, FIR filtering, etc. This way, only the first of the number of multiplications having the same multiplicand is completely implemented while the others are only partially implemented avoiding the most resource demanding part of computing the potential partial products. For example, when multiplying a matrix to a vector, complete multiplications are implemented only for computing the first component of the output vector while the rest of the multiplications for computing the other components of the output vector are implemented only partially. When implementing FIR filtering, complete multiplications are implemented only once, when computing the first output sample, but the rest of the multiplications for computing the other output samples are implemented incompletely.

The second embodiment utilizes a parallel multiplier structure in matrix-vector arithmetic and at the same time is flexible, giving an opportunity to configure it to smaller tasks.

The structure of the second embodiment of the invention provides a structure that either may be realized as a device that may be configured to implement a list of operations including: (a) a plurality of multiplications; (b) a plurality of MAC operations; (c) a plurality of additions/subtractions of different precision (bit-width); and/or (d) parallel accumulation.

The third embodiment is a combination of the parallel multiplier structure and a sum of absolute differences (SAD) accelerator structure for video and image processing (MA-VIP). The structure is a multifunctional architecture in such a way that it can be configured to different architectures by a set of control signals.

To be exact, the method according to the present invention is primarily characterized in that in said first calculation operation, output data of at least one pipeline stage is stored into a memory, and in said second calculation operation the stored data is used as input data to a pipeline stage. The system according to the present invention is primarily characterized in that the system further includes a memory for storing in said first calculation operation output data of at least one pipeline stage, and a data retriever for using the stored data in said second calculation operation as input data to a pipeline stage. The device according to the present invention is primarily characterized in that the device further includes a memory for storing in said first calculation operation output data of at least one pipeline stage, and a data retriever for using the stored data in said second calculation operation as input data to a pipeline stage.

The present invention shows remarkable advantages compared to solutions of prior art. A VLSI architecture suitable for efficient implementation of a wide range of arithmetic patterns frequently implemented in signal processing applications such as video/image processing algorithms can be developed. By using a method according to the invention the multiplication operations in the context of video/image processing can be performed faster and with less power than with prior art methods and devices. The invention is especially efficient for implementing a plurality of multiplications/MACs, and for implementing a plurality of multiplications/MACs with one shared operand (shared multiplicand). Significant reduction in the area and power consumption can be achieved due to the ability to store the potential partial products and use them with successive calculation operations. Also the ability of another advantageous embodiment of the present invention to set the different pipeline stages to power saving mode when they are not needed and/or to use different pipeline stages to perform different calculation operations substantially simultaneously results in reduced power consumption. High speed performance (high throughput) is due to utilization of pipelining with a flexible possibility of balancing the delays of different pipeline stages and reducing the period of the total structure to the delay of the fastest block. Increasing of the throughput is achieved with a minimal increase in the area and without increasing the input/output bus width as compared to a single pipelined prior art (radix-4 or higher) multiplier.

The memory unit also allows utilization of the first pipeline stage for another task in parallel with the other stages, that is, simultaneously with implementing a multiplication based operation, parallel addition/subtraction operations (of varying precision) may be implemented for another task.

Still another advantage of one advantageous embodiment of the present invention is that it is not necessary to balance the first pipeline stage of the architecture, i.e. the arrays of adders for computing potential partial products, with other stages since it is out of the critical path during most of the cycles.

The configurable structure according to an advantageous embodiment of the present invention makes it possible to reuse the same device for different operations. Moreover, operations may be implemented with different bit-precision of input arguments, e.g. eight parallel 8-bit additions or four parallel 16-bit additions.

Significant time and power/energy consumption savings are achieved since the most costly part, the computation of the potential partial products is discarded from most of the multiplication operations.

Being multifunctional, an advantageous embodiment of the present invention can replace several hardware accelerators specialized for a certain signal processing operations, for example, video/image processing operations.

BRIEF DISCUSSION OF THE DRAWINGS

Figure 4:
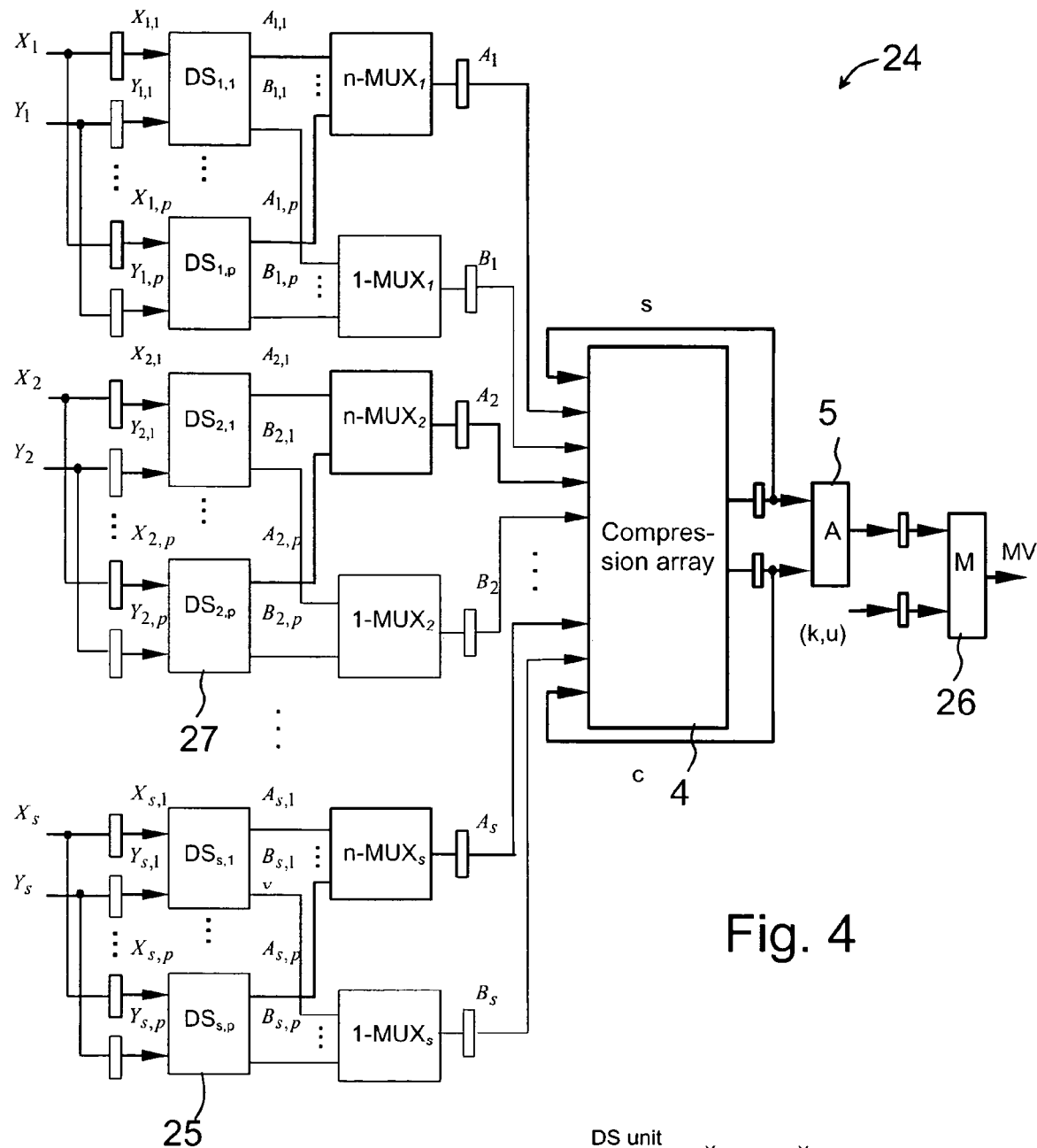
Figure 5:
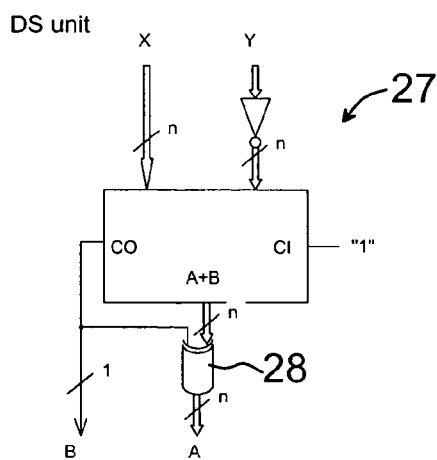
Figure 6:
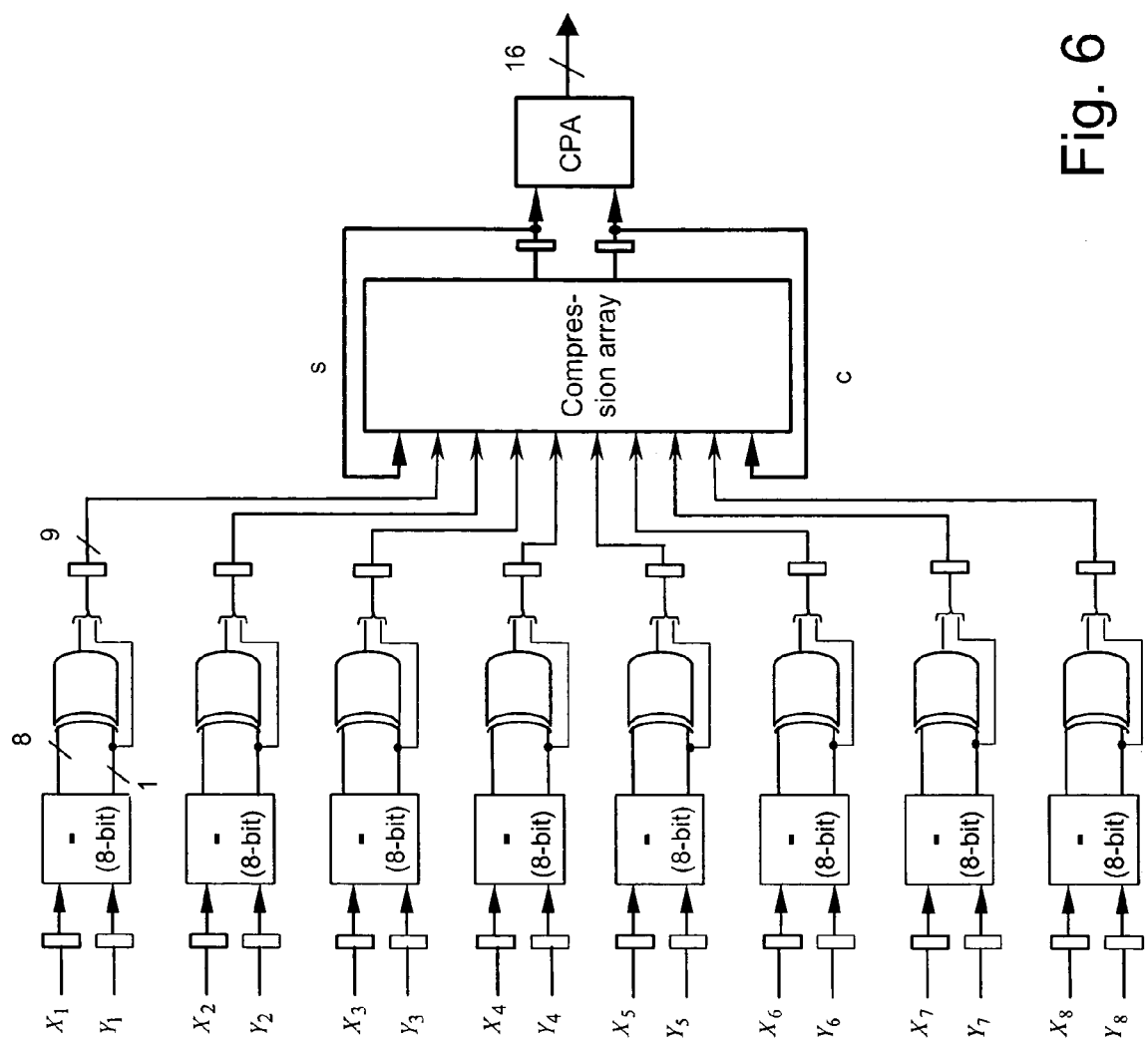
Figure 7:
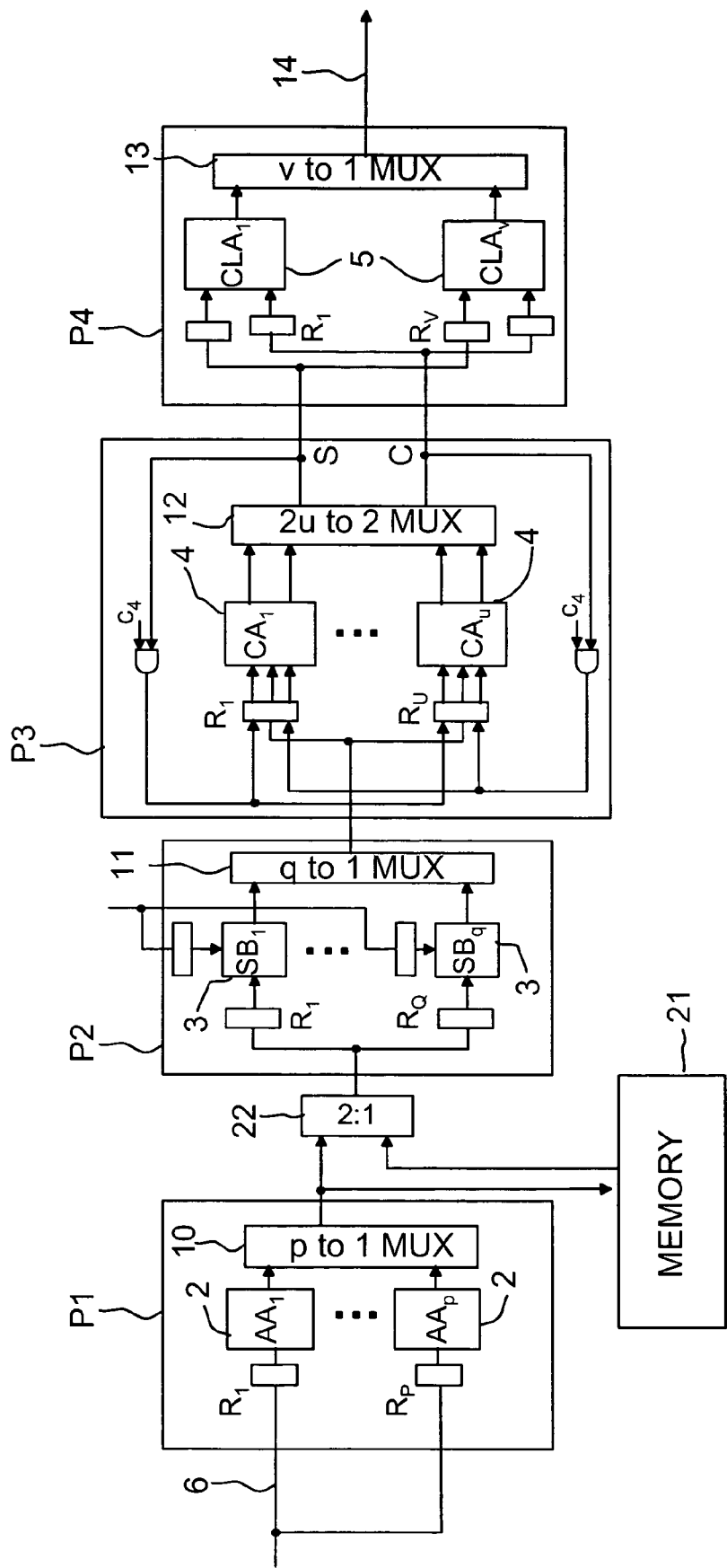
Figure 8:
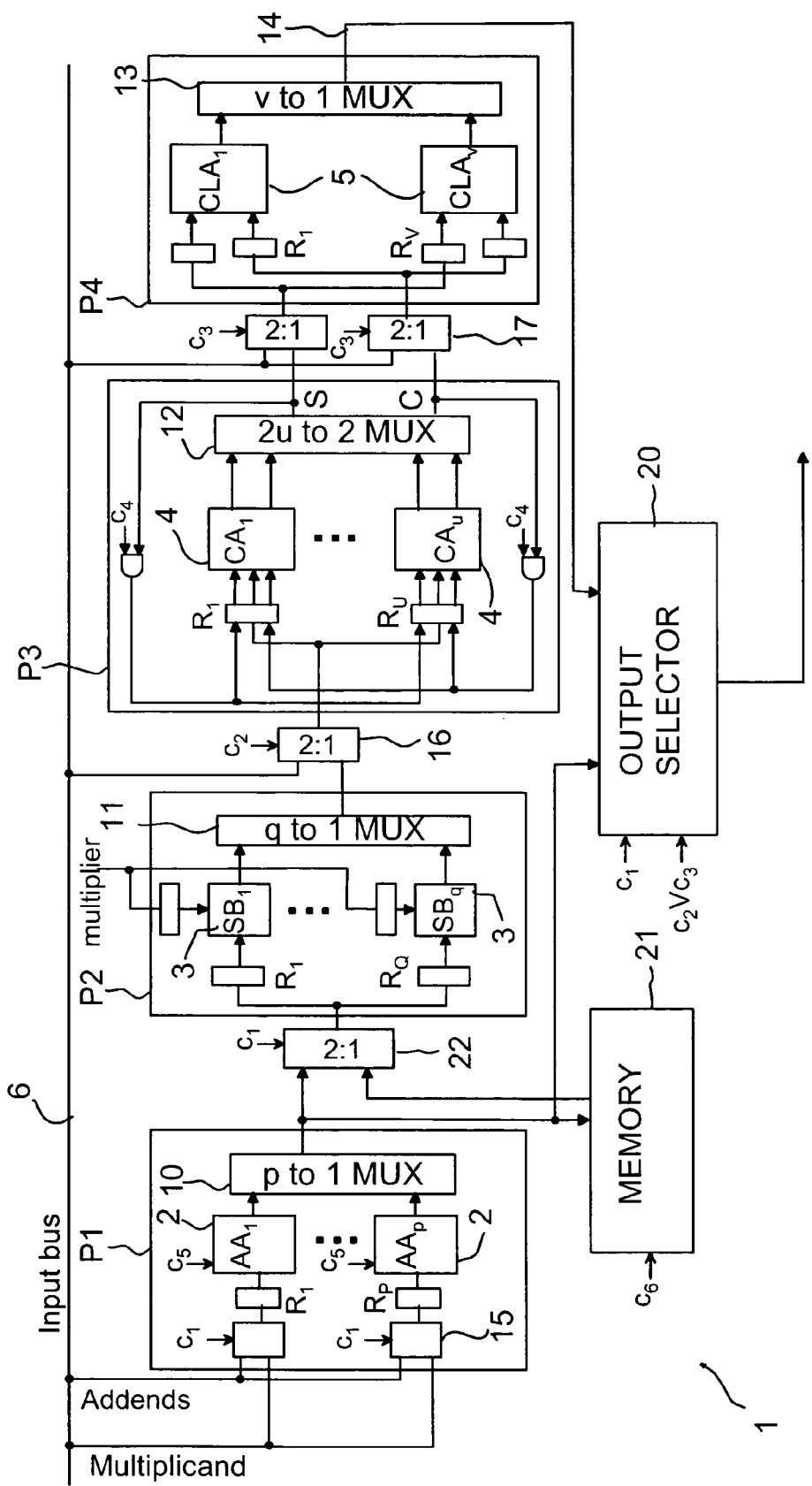
Figure 9:
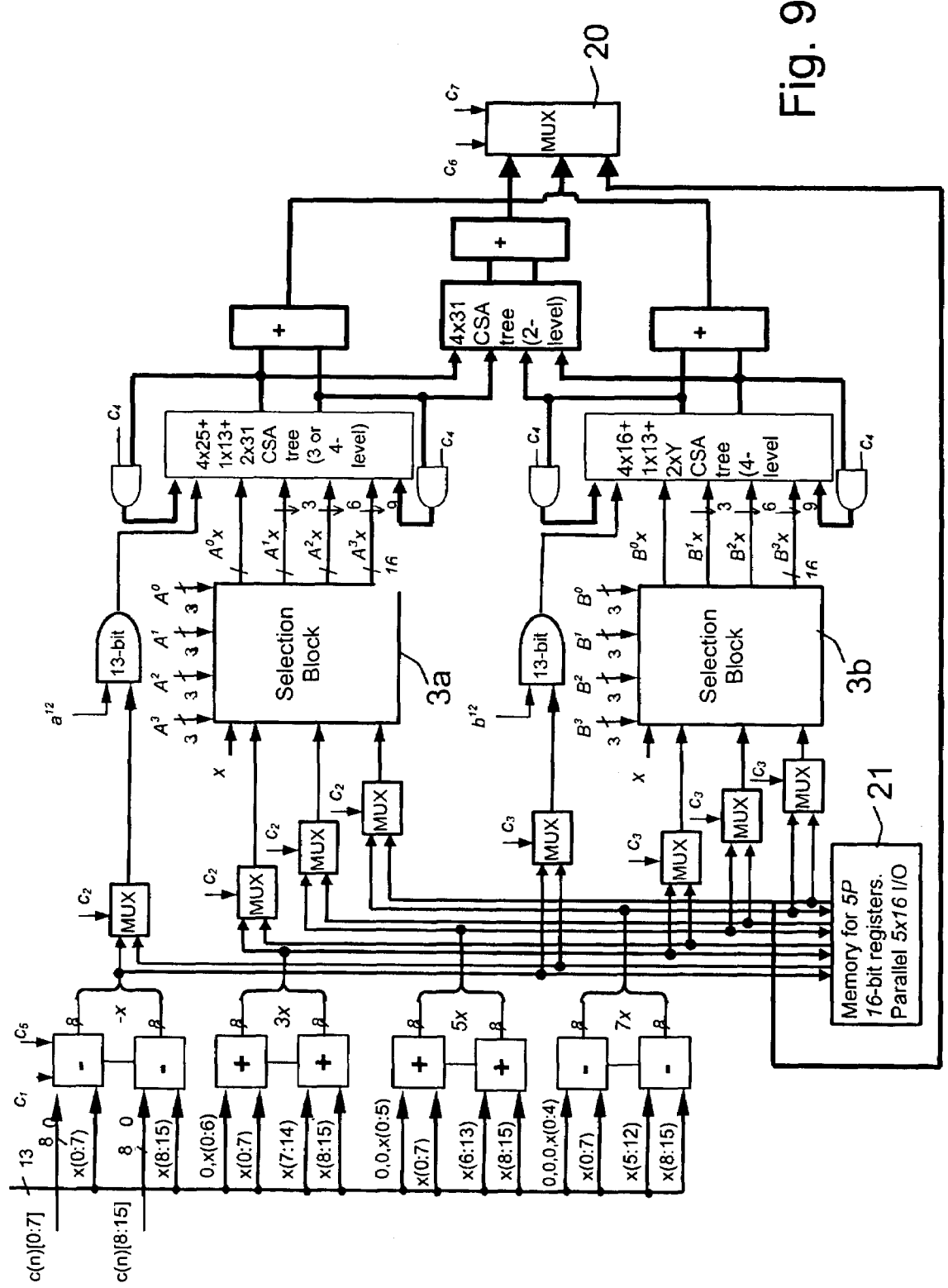
Figure 10B:
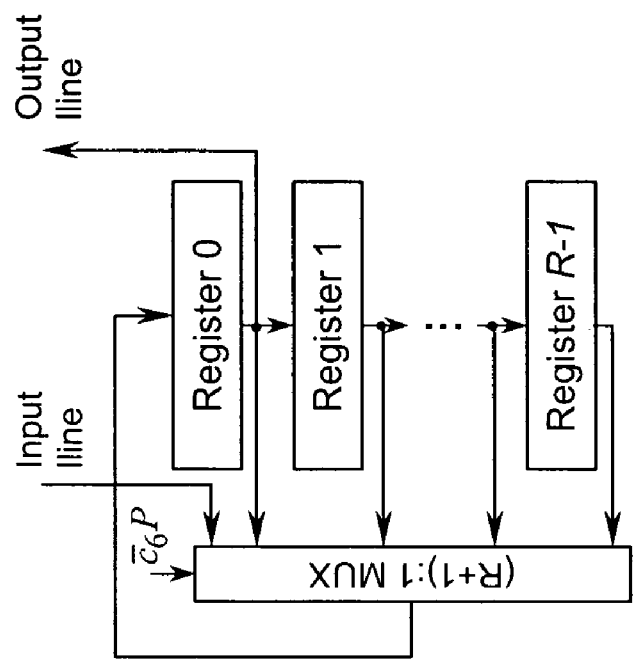
Figure 10A:
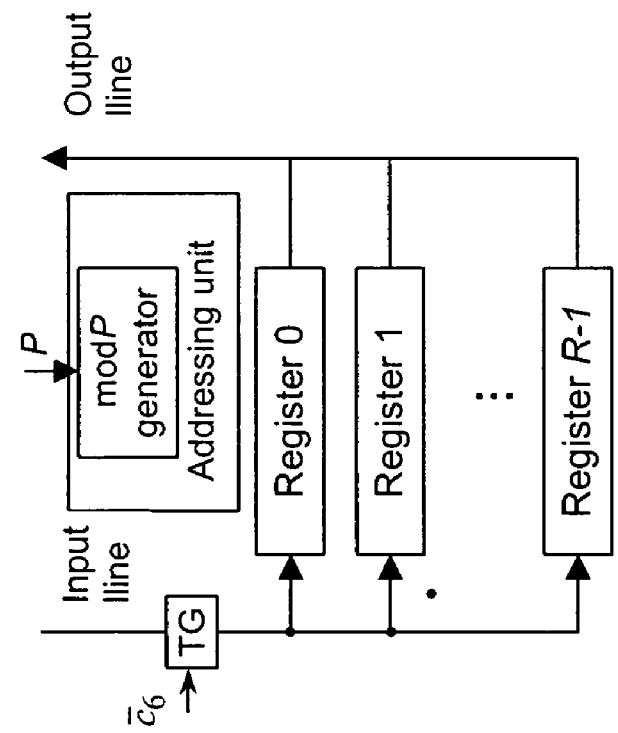
Figure 11:
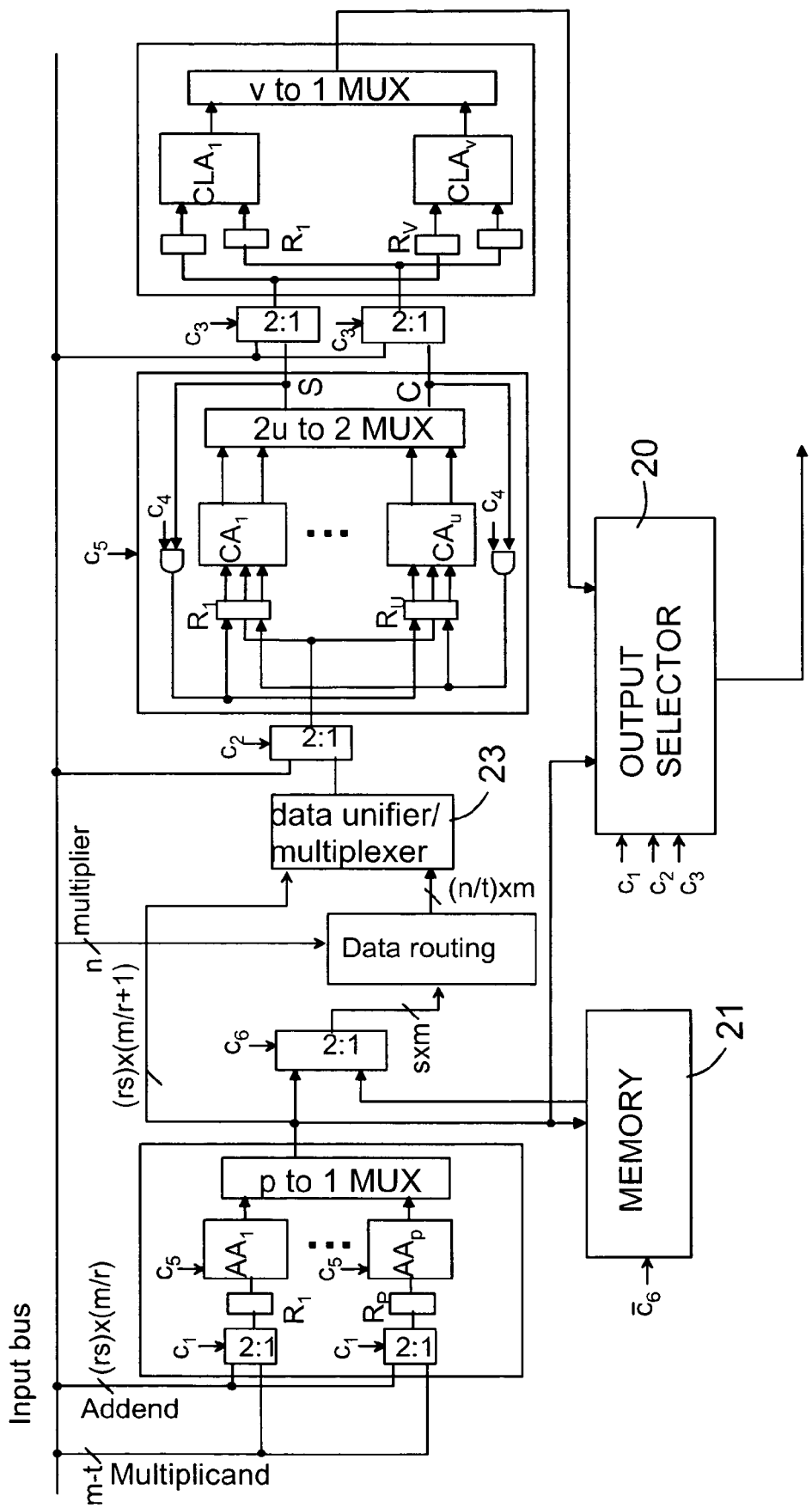
Figure 12:
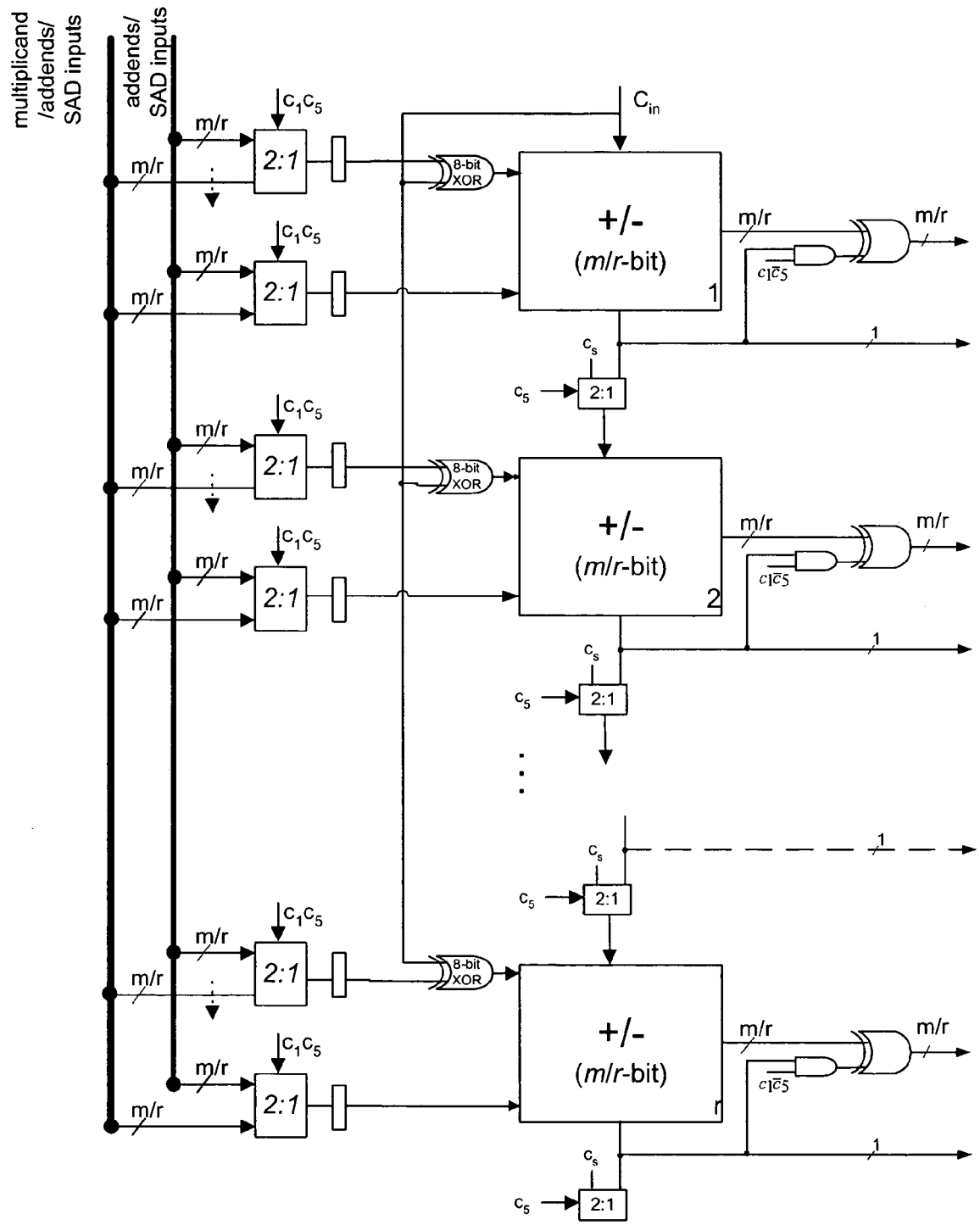
Figure 13:
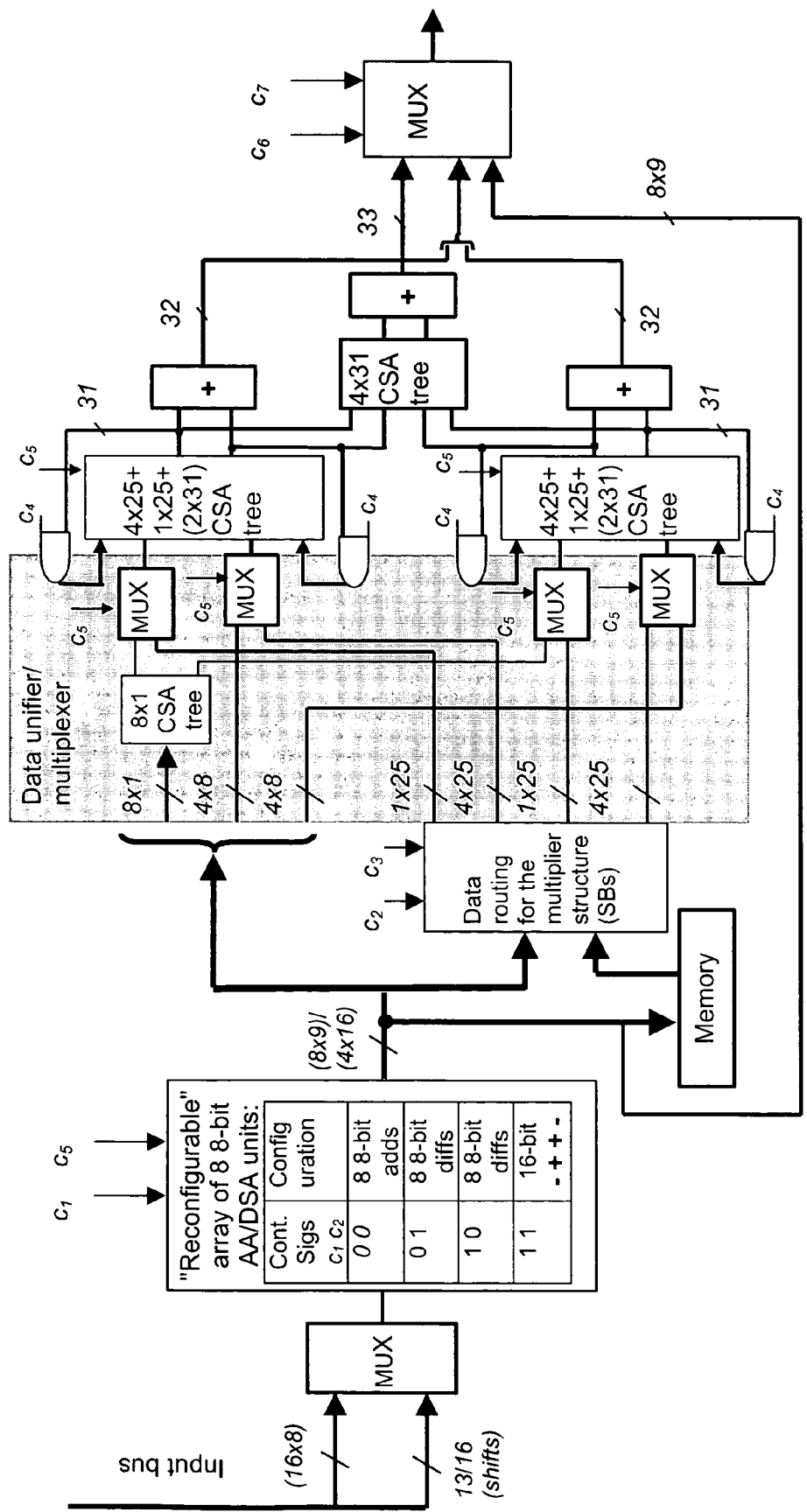
Figure 14:
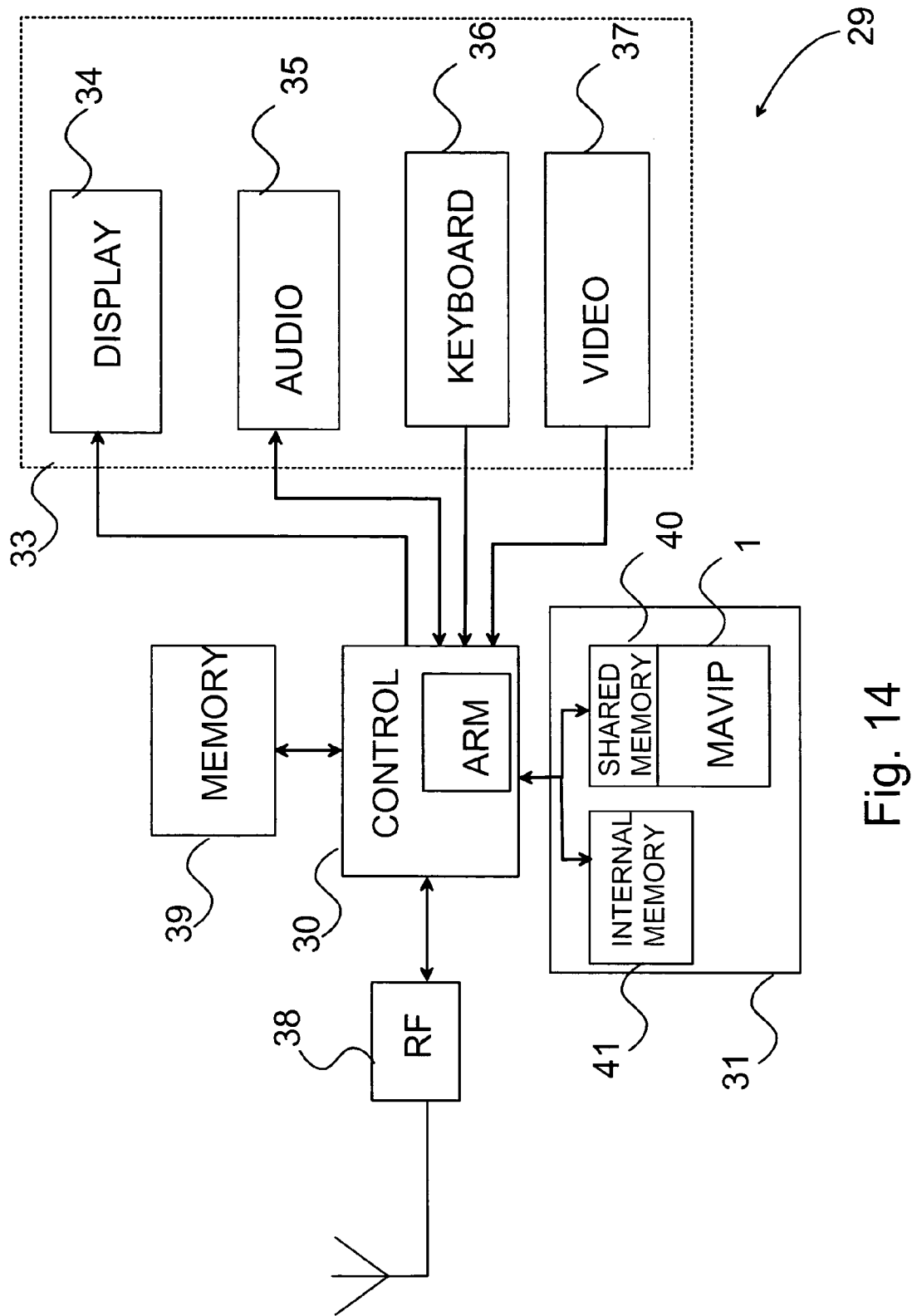

In the following the present invention will be described in more detail with reference to the appended drawings, in which FIG. 1 illustrates a typical structure of prior art radix-4 Booth recoded multipliers, FIG. 2 illustrates a general structure of radix-T Booth recoded ($T \geq 8$) or non-recoded ($T \geq 4$) multipliers, FIG. 3a illustrates one embodiment of the summation block within a parallel radix-T MAC unit structure, in which the summation block is implemented as a common compression array for n/t selected partial products and for feedback sum and carry terms, FIG. 3b illustrates another embodiment of the summation block within a parallel radix-T MAC unit structure, in which the summation block is implemented as a split compression array, FIG. 4 shows a general structure of a sum-of-absolute-differences architecture, in which the DS unit operates as a subtracter followed by XOR gates, FIG. 5 shows a general structure of the DS unit, FIG. 6 illustrates an example of the sum-of-absolute-differences architecture, in which p=1, s=8, n=8, FIG. 7 illustrates as a simplified block diagram the general structure of the calculation device according to the first advantageous embodiment of the present invention, FIG. 8 illustrates as a simplified block diagram the general structure of the configurable calculation device according to the second advantageous embodiment of the present invention for plurality of multiplications/MAC operations, FIG. 9 illustrates an advantageous embodiment of the architecture according to the present invention for matrix-vector arithmetic of two simultaneous (13×13)-bit multiply-accumulate operations, FIG. 10a illustrates a register memory with an addressing unit operating in circular mod P mode, FIG. 10b illustrates a shift register memory with a circular mod P feedback loop, FIG. 11 illustrates a general structure of a multifunctional architecture for video and image processing according to the present invention, FIG. 12 illustrates an example realization of the AA/DSA unit, FIG. 13 illustrates an example realization of a multifunctional architecture for video and image processing obtained by unifying the SAD structure on FIG. 6 and the architecture for matrix-vector arithmetic on FIG. 9, and FIG. 14 illustrates a device according to an advantageous embodiment of the invention as a simplified block diagram.

DETAILED DESCRIPTION OF THE INVENTION

In the following, the first advantageous embodiment of the present invention will be described in more detail. The general structure of the first embodiment of the device according to the present invention is illustrated on FIG. 7. The device 1 is divided into a set of different pipeline stages P1 to P4. In this embodiment the device 1 comprises four pipeline stages but it is obvious that within the scope of the present invention the number of pipeline stages can be different than four. The structure also incorporates a memory block where the outputs from the first pipeline stage corresponding to one operation may be written and reused as the input to the second pipeline stage for another operation.

Pipelining is a common way to increase the throughput of the system for implementing a plurality of similar operations, e.g. multiplication and/or MAC. Considering a typical pipelined realization of a prior art radix-T Booth-recoded (T=8, 16) or non-recoded (T=4,8) multiplier structures, the first pipeline stage P1 would be the Array of s Adders with s given in Table 2a, the second stage P2 would be the Selection Block, the third stage P3 would be the Compression Array, and last several stages P4 (their number being different in different realizations) would constitute the Final Adder.

In one realization of the device according to the first advantageous embodiment of the present invention incorporates a plurality (bank) of multipliers/MAC units. The general structure of the variety of banks of radix-T Booth recoded (T=8, 16) or non-recoded (T=4,8) multipliers is schematically shown on FIG. 7. The advantageous embodiment of the structure for a bank of multipliers/MAC units may in general be described as a pipelined device 1 wherein the first pipeline stage P1 comprises a plurality of, e.g. p, arrays of s adders (AAs) 2, and all the arrays of s adders 2 share the same input lines 6. The second pipeline stage P2 is a plurality of, e.g. q, selection blocks (SB's) 3, the third stage P3 is a plurality of, e.g. u, compression arrays (CA's) 4, and the fourth pipeline stage P4 constitute a plurality of, e.g. v, final carry-look-ahead adders (CLA's) 5. The basic functional blocks (AA's, SB's, CA's, and CLA's) can actually be the same as may be used in the corresponding type of prior art multipliers and/or MAC units. Thus, the case p=q=u v=1 corresponds to the case of a prior art multiplier/MAC unit structure. The main difference is that the device includes a memory 21 which can be used to store intermediate results of one or more calculation operations. One non-restrictive example of such intermediate results are potential partial products. The multiplexer 22 can be used to select either the output of the first pipeline stage or the memory 21 as the input of the second pipeline stage P2. In an advantageous embodiment at least some of the basic blocks of the prior art structure are replaced with more than one basic block. The operation of the device depends on several parameters (p, q, u and v) by appropriate selection of which the device with well-balanced pipeline stages can be designed. Blocks within one pipeline stage operate preferably in a time-interlaced manner in such a way that throughputs of the pipeline stages may be varied in order to make them approximately equal to each other, and to match the desired operating step duration.

The principle of time-interlaced operation of a plurality of functional blocks is briefly explained below. Consider a functional block FB to be used in a pipeline stage of a bigger system, and suppose that it has an estimated delay of $D_{FB} \approx pT_{des}$ (but $D_{FB} \leq pT_{des}$) where $T_{des}$ is the desired operating step duration of the system. Then, in order to make the pipeline stage P1, . . . , P4 to operate with the throughput matching the duration of one step, the serial Functional Block may be replaced with a plurality $FB_1$, $FB_2$, . . . , $FB_w$ of w Functional Blocks having pipeline registers (latches) $R_1$, . . . , $R_w$ at their inputs and a w:1 multiplexer 10, 11, 12, 13 at their outputs. The parameter w depends on the pipeline stage in question. For the first pipeline stage P1 the parameter w corresponds to the parameter p i.e. there are p pipeline registers $R_1$, . . . , $R_p$ and the multiplexer 10 of the first pipeline stage selects one of the p inputs for its output. For the second pipeline stage P2 the parameter w corresponds to the parameter q i.e. there are q pipeline registers $R_1$, . . . , $R_q$ and the multiplexer 11 of the second pipeline stage P2 selects one of the q inputs for its output, respectively. For the third pipeline stage P3 the parameter w corresponds to the parameter u i.e. there are u pipeline registers $R_1$, . . . , $R_u$ and the multiplexer 12 of the third pipeline stage P3 comprises two multiplexers (not shown) each of which select one of the u inputs for its output. For the fourth pipeline stage P4 the parameter w corresponds to the parameter v i.e. there are v pipeline registers $R_1$, . . . , $R_v$ and the multiplexer 13 of the fourth pipeline stage P4 selects one of the v inputs for its output 414. The shared input to the pipeline stage P1, P2, P3, P4 is connected to everyone of w pipeline registers $R_1$, . . . , $R_w$. However, everyone of these registers is open only one out of every w operating steps with a time offset of one operating step. This way, at every operating step, the input I is actually connected to the input of only one Functional Block while the other connections are inactive since the input registers of all the other Functional Blocks within their plurality forming the considered pipeline stage are closed for writing. The register $R_1$ at the input of the first functional block $FB_1$ is open during the first of every w operating steps, the register $R_2$ at the input of the second functional block $FB_2$ is open during the second of every w operating steps, etc. In general, at the operating step t=1, 2, . . . , K, the input I is actually connected to the input of only the $FB_f$, where $f$=(t−1)mod w+1. Thus, the input I is spatially shared but temporally distributed among the functional blocks $FB_1$, . . . , $FB_w$ of the considered pipeline stage. During the operation of the system, at the operating step t=1, 2, . . . , K, one sample $X_t$ of the input data stream to that stage enters to the functional block $FB_f$, $f$=(t−1)mod w+1 which is initiated at that stage. Once the $FB_f$ completes its operation over $X_t$ at the end of the operating step t+w−1, t=1, 2, . . . , K, the w:1 multiplexer 10, 11, 12, 13 at the outputs of the functional blocks passes the results obtained in $FB_f$ to the output of the stage at the next operating step t+w, t=1, 2, . . . , K. For this reason the multiplexer 10, 11, 12, 13 operates according to circular mod w rule.

By replacing every functional block of a prior art multiplier/MAC unit structure with a plurality of similar functional blocks and by making use of the principle of time-interlaced operation, a better balancing of the pipeline stages may be achieved with respect to a predetermined operating step duration by appropriate selection of the numbers of blocks within every pipeline stage (that is, parameters p, q, u, and v). Suppose that the delays of the four pipeline stages within a prior art multiplier/MAC unit structure are $D_{AA}$, $D_{SB}$, $D_{CA}$, $D_{CLA}$, respectively, and the desired throughput of the system is $N_{des}$ multiplications MAC/operations per second, then the desired operating step duration will be chosen to be $T_{des}$ seconds, so that $T_{des} \leq 1 N_{des}$, and the mentioned design parameters will be selected as $p=\lceil D_{AA}/T_{des} \rceil$, $q=\lceil D_{SB}/T_{des} \rceil$, $u=\lceil D_{CA}/T_{des} \rceil$, and $v=\lceil D_{CLA}/T_{des} \rceil$, in which the notation $\lceil x \rceil$ means rounding up to the next integer value.

FIG. 8 depicts the calculation device according to the second advantageous embodiment of the present invention. The configurability of the structure according to the second advantageous embodiment of the present invention is achieved by including one or more selection means e.g. multiplexers 15, 16, 17 at the inputs of the first P1, third P3, and the fourth pipeline stages P4. The multiplexers 15, 16, 17 are advantageously 2:1 multiplexers. They are controlled by control signals $c_1$, $c_2$, and $c_3$, respectively. The structure also comprises an output selector 20 which is controlled by the first control signal $c_1$ and an OR-combination of the second $c_2$ and the third control signals $c_3$ (i.e. $c_2 \lor c_3$). The output selector 20 selects the data from the output of the first P1 or from the last pipeline stage P4 to be connected to the output bus 14 of the structure. The first inputs of the multiplexers 15, 16, 17 are connected to corresponding lines of the input bus 6 of the structure, and the second inputs of the multiplexers 15, 16, 17 are connected so that if the second inputs are activated, the structure operates as a multiplication/MAC operation device. Thus different configurations of the structure are possible for different sets of control signals $c_1$, $c_2$, and $c_3$. The selection means can be used to reroute the signal path(s) internal to the device and also to select an output signal from a set of internal signals. The selection means select input of at least one pipeline stage among at least two alternatives. The dependence of the configuration on these signals is as follows.

When all the control signals $c_1$, $c_2$, $c_3$ are set to logical 1-state, i.e. $c_1=c_2=c_3=1$, the structure behaves as a multiplication/MAC operation device. In a situation in which the first control signal $c_1$ is in logical 0-state and the other two control signals $c_2$, $c_3$ are in logical 1-state, i.e. $c_1=0$; $c_2=c_3=1$, the structure behaves as an array of sp adder/subtracters. Only the first pipeline stage P1 (i.e. the array of adders 2) is activated while the others are idle. The third alternative is that the first control signal $c_1$, is set to logical 1-state while the second $c_2$ and the third control signals $c_3$ are set to logical 0-state ($c_1=1$; $c_2=c_3=0$). This means that the structure behaves as an accumulator. Only compression arrays 4 and the final adders 5 operate while the arrays of adders and the selection blocks are idle. In the fourth alternative the first $c_1$ and second control signals $c_2$ are both set to logical 1-state and the third control signal $c_3$ is set to logical 0-state ($c_1=c_2=1$: $c_3=0$). In that situation the structure behaves as a fast adder of a wide precision. Yet in another alternative, when $c_1=c_2=c_3=0$, the structure simultaneously behaves as an array of sp adders/subtractors and an accumulator. It should be evident that the above mentioned selection means 16, 17, 20 as well as the dependence of the structure/operation modes on the states of the control signals $c_1$, $c_2$, $c_3$ are just one possible alternative but also other alternatives can be applied within the scope of the present invention. This also applies to other control signals which will be described later in this description.

In the structure of FIG. 8 there are two other control signals $c_4$ and $c_5$ which add multifunctionality to the structure without reconfiguring it. The fourth control signal $c_4$ activates (if e.g. $c_4$=1) or disactivates (if e.g. $c_4$=0) feedback loops between outputs and inputs of compression arrays 4 within the third pipeline stage P3. Thus the structure operates as a multiplier if $c_1=c_2=c_3=1$, $c_4=0$ and it operates as a MAC unit if $c_1=c_2=c_3=c_4=1$. The fifth control signal $c_5$ (which may be a 1-, 2-, or 3-bit signal) controls the precision of the adder/subtracters within the first pipeline stage P1 by permitting (corresponding bit of $c_5$ is e.g. logical 1) or stopping (corresponding bit of $c_5$ is e.g. logical 0) carry propagation between blocks of full adders 5. This way, the plurality of arrays of adders containing sp adders/subtracters for m-bit inputs may also operate as a plurality of 2sp adders/subtracters for (m/2)-bit inputs or as a plurality of 4sp adders/subtracters for (m/4)-bit inputs, etc. It is also possible that selection blocks 3, compression arrays 4, and the final adders 5 may be modified slightly and made controllable by a control signal also allowing implementation of various precision multiplication/MAC operations.

Architectures for Matrix-Vector Arithmetic

In the following, the advantageous embodiments of the multiplier/MAC unit structures according to the present invention will be used for performing matrix-vector operations such as a scalar to a vector or to a matrix multiplication, a matrix to vector multiplication (and thus matrix-to matrix multiplication, an inverse matrix computation, color conversions, fast orthogonal transforms, e.g., FFT, fast DCT, etc.), and convolution or FIR filtering, and thus filter bank and, in particular, discrete wavelet transform implementations. Common to these operations is that one multiplicand x is multiplied with a number of multipliers $a_i$, i=1, ..., K. On the other hand, an essential feature of the high radix multiplication methods is that a significant complexity is moved to the first step (forming partial products) from the second step (summing up partial products). More complexity is moved with higher radices.

The main idea of this advantageous application is to compute potential partial products of the common multiplicand x only once when multiplying it by the first multiplier $a_1$ and then reuse these potential partial products when multiplying x with the rest of multipliers $a_i$, i=2, ..., K. This way, only one out of K multiplications will be completely executed while K−1 multiplications will be executed incompletely, without executing the most complicated part of a high-radix multiplication method (that is the computation of the potential partial products). Clearly, significant savings in time and power/energy consumption will then be achieved.

According to this idea, the general structure of the proposed architecture for matrix-vector arithmetic can be derived from the multiplier/MAC unit structure of the first as well as from the reconfigurable device of the second advantageous embodiments of the present invention. This is achieved by utilizing the memory 21 as depicted on FIGS. 7 and 8. There is a sixth control signal $c_6$ according to which the memory 21 is either open (when the sixth control signal $c_6$ is e.g. set to logical 0 (low)) or closed (when the sixth control signal $c_6$ is e.g. set to logical 1 (high)) for writing. When the memory 21 is set open for writing, the potential partial products can be stored from the output of the plurality of arrays of adders 2 to the memory 21. The same control signal $c_6$ can be used to control the 2:1 multiplexer 22. The first input of the multiplexer 22 is connected to the output of the plurality of arrays of adders 2, and the second input of the multiplexer 22 is connected to the output of the memory 21. Thus, the potential partial products enter to the input of the plurality of selection blocks 3 either directly from the output of the plurality of arrays of adders 2 (when the sixth control signal $c_6$ is e.g. set to logical 0) or from the memory 21 (when the sixth control signal $c_6$ is e.g. set to logical 1).

FIG. 9 depicts an example structure for matrix-vector arithmetic for the case where two (13×13)-bit multiply accumulate operations can be performed simultaneously. The structure incorporates two separate selection blocks 3a, 3b controlled by the bits of two different multipliers. Either the potential partial products of the same multiplicand (if $c_2=c_3$) or potential partial products of two different multiplicands (if $c_2 \neq c_3$) may be selected to be input to the selection blocks 3a, 3b. Outputs of the two selection blocks are input to two separate compression arrays having 31-bit feedbacks (b=32 is the maximum bit precision for the final accumulated result in this case). The sum S and carry C outputs of these compression arrays may either be combined within the (4×31)-input compression array followed by a final adder to form one accumulation term or may be pair wise added to form two accumulation terms. This way, two separate compression arrays, each having smaller depth and, hence, a shorter feedback loop, operate at the accumulation stage. After that, the two pairs of sum and carry terms are either separately (pair wise) added in two CPAs or jointly added in the third summation block. In the first case, the results of two separate operations (e.g. two output components in a matrix-vector multiplication) are simultaneously obtained. In the second case, the calculation of one complex operation is split into two smaller ones and then the results are combined.

Actually, any read/write memory can be used in the proposed structure for matrix-vector arithmetic. Two recommended memory types are depicted on FIGS. 10a and 10b. The memory type depicted on FIG. 10a corresponds to the case of register memory with R registers of the length L where L is large enough to store potential partial products for one multiplicand in one register: L≧(m+t)s, where m is the bit precision of the multiplicand, t=log T, T is the radix of the multiplication method used, and s is the number of adders/subtracters within every array of adders. The addressing unit of this memory type should be able to generate addresses according to circular mod P rule for any positive integer P≦R. This means that at operating step t=1, 2, ..., the addressing unit generates a(t)=(t−1)mod P as the current address value. Then the potential partial product value on the input line is written to the register a(t), a(t)∈{0, 1, ..., R−1}, if the sixth control signal $c_6$ is low (to the memory), or the contents of the register a(t), a(t)∈{0, 1, ..., R−1}, i.e. previously stored potential partial product values, are written to the output line, if the sixth control signal $c_6$ is high (from the memory).

The second memory type depicted in FIG. 10b operates in a similar Mod P manner but is organized as a shift register with controllable feedback. At every operating step data from pth register unit, p=0, ..., P−2, are moved to the (p+1)st register unit if the latter one is not halted. There are feedback lines from every register unit. All the feedback lines are input to a (R+1):1 multiplexer having also the input line as another input (to the memory). The multiplexer is controlled by a (log R)-bit signal the value of which is set to $c_6$P so that either data from the input line (if $c_6$=0) or from the feedback loop originating at the output of the (P−1)st register (if $c_6$=1) are written into the 0th register. The output from the memory is always taken from the 0th register.

In the following, execution of three operations frequently implemented in video and image processing will be considered in more detail. It should be noted that these are just example implementations for only particular operations but the present invention is not restricted to only these operations nor exactly to the presented methods. All the other operations that involve multiplication of a common multiplicand by a number of multipliers may similarly be executed by the architecture according to the invention for matrix-vector arithmetic. Also other similar algorithms for the considered operations may be developed.

First, execution of the scalar to a vector multiplication operation xa is considered, which is the most evident case where a common multiplicand (scalar) x is to be multiplied with a big number of multipliers $a_i$, i=1, ..., K, the components of the vector a. At the first step, when implementing multiplication of the common multiplicand with the first multiplier $a_1$, the sixth control signal $c_6$ is set to low so that potential partial products of x directly pass from the arrays of adders 2 of the first pipeline stage P1 to the plurality of selection blocks 3 of the second pipeline stage P2, and, at the same time, are written into the memory 21. The memory 21 is set to operate according to mod 1 mode and all its registers except for the 0th one are halted. All but the first array of adders 2a of the first pipeline stage are also halted if multiplication of only one scalar to one or to several vectors is to be implemented. Starting from the second operating step, the sixth control signal $c_6$ is set to high so that the memory 21 is closed for writing and potential partial products of x, that have been written in the memory after the first step, are fetched from the memory 21 to the selection blocks 3 through the second input of the corresponding 2:1 multiplexer 22. At the same time, all the arrays of adders 2 (including the first one) are either halted or switched to another task. Thus, time savings are achieved because of the reduction of the critical path of the multiplication operation by discarding the most costly part, namely, the computation of potential partial products. Significant savings in power and energy consumption are achieved because the first pipeline stage is halted or is switched to another task during K-1 out of K operating steps. Another advantage is that, in this computational scheme, it is not necessary to balance the first pipeline stage P1 with other pipeline stages P2 to P4 since it is out of the critical path during K-1 out of K operating steps. Yet another advantage is that the multiplicand x is fetched only once from the external memory (not shown) while in a conventional implementation it would have to be fetched K times.

The second operation that will be considered here is the matrix-vector multiplication s=Ax, or equivalently, $$s_i = \sum_{j=1}^{P} a_{i,j} x_j, i = 1, 2, \ldots, K$$

This operation is a part of many linear algebra and video/image processing algorithms such as matrix-to-matrix multiplication, inverse matrix computation, image color space conversions, fast orthogonal transforms, (e.g., FFT, fast DCT, etc.), geometric manipulations, edge detection, and others. The matrix-to-vector multiplication could be considered as multiple vector-to-vector multiplications and so it could be implemented with a MAC unit or with a bank of them. However, it should be noted that every component (multiplicand) $x_j$, j=1, ..., P, of the input vector x is multiplied by K multipliers, components of the jth column of the matrix A. Utilization of the memory 21 within the structure for matrix-vector arithmetic according to this embodiment of the present invention allows for computation of potential partial products only once for every component $x_j$, j=1, ..., P, of the input vector x. The potential partial products are then saved into the memory 21 provided that it contains enough registers (i.e., P≦R).

As is known from graph theory the critical path mentioned above expresses the longest route from a starting node to an end node. When applied with the present invention the critical path expresses the longest route from the beginning of the calculation process to the end of the calculation process in the pipelined system. The length of the critical path describes the time taken for performance of the calculation operation. By using critical path analysis it is possible to find such parts of the system which affect to the length of the critical path. When such parts are found they can be analyzed to find if there exist any possibilities to shorten the length of such parts. Respectively, it is normally not necessary or useful to try to shorten such parts which do not belong to the critical path.

In order to initialize multiplication of a (K×P)-matrix to a vector the structure according to an advantageous embodiment of the present invention is configured by setting appropriate values for the control signals as follows. The memory 21 is set to operate according to mod P mode and the registers from P to R of the memory are halted. The compression array 4 of the architecture is set to operate as an accumulator by setting the fifth control signal $c_5$ to high. The sixth control signal $c_6$ is set to low in the beginning while potential partial products for every component $x_j$, j=1, ..., P, are formed during P operating steps t=p+1, ..., p+P, where p steps is the delay of the first pipeline stage which is equal to the number of arrays of adders within it. During these operating steps potential partial products for component $x_j$, j=1, ..., P, are directly passed from the arrays of adders 2 of the first pipeline stage P1 via the multiplexer 22 to the plurality of selection blocks 3 of the second pipeline stage P2, and, at the same time, are written into the memory 21. Thus, multiplication of the first row of the matrix A by the input vector x is implemented, and substantially simultaneously, potential partial products for every component $x_j$, j=1, ..., P, are stored in consecutive registers. After the operating step p+P, the control signal $c_6$ is set to high so that the memory 21 is closed for writing and potential partial products for $x_j$, j=1, ..., P, are circularly fetched to the input of the plurality of selection blocks 3 from the memory 21 through the second input of the 2:1 multiplexer. Also, the fifth control signal $c_5$ is set to low for one step in order to restart new accumulation. This is repeated K-1 times until all the rows of the matrix A will be multiplied with the input vector x. Starting from the operating step p+P, all the arrays of adders 2 (including the first one) are either halted or switched to another task. Thus, only P out of PK multiplications are completely implemented while P(K-1) of them are implemented partially, without the first, most complicated step. Similarly to the case of the scalar-to-vector multiplication operation, this leads to significant savings in time and power/energy consumption.

In the following, convolution or FIR filtering implementation on the structure according to the present invention will be considered in more detail. The operation to be performed is $$s_i = \sum_{j=1}^{P} a_j x_{i-j}, i = 1, \ldots, K$$

where usually P<<K. Two strategies are possible to implement FIR filtering on the structure according to the present invention for matrix-vector arithmetic.

In the first strategy the FIR filtering will be considered as multiplication of the P-diagonal (or P-taped) matrix A with the input vector, which is appended with P components $x_i$, i=−P+1, . . . , 0 corresponding to negative indices and is shifted for P positions down. Taking into account that the matrix A is sparse (it has non-zero entries only on P diagonals) the above general strategy for matrix-vector multiplication will be slightly modified to the case of FIR filtering. The ith row, i=1, . . . , K, of the matrix A has only P non-zero entries, the filter coefficients $a_j$, j=1, . . . , P, at the columns i, i+1, . . . , i+P−1. In this embodiment the potential partial products are not simultaneously stored in the memory for all the components of the input vector, but potential partial products for only P components are simultaneously stored. Every P operating steps a new set of potential partial products for the current input sample is computed within the plurality of the arrays of adders and it replaces the set of potential partial products stored in the memory 21 P operating steps earlier. This is achieved by setting the sixth control signal $c_6$ to low every P operating steps. Therefore, the plurality of the arrays of adders 2 cannot be fully halted but they can operate P times slower than in an implementation without storing potential partial products. Only P+K out of PK multiplications are completely implemented while the others are only partially implemented.

In the second strategy for FIR filtering implementation potential partial products for the P filter coefficients are stored in the memory 21 while computing the first output sample. These potential partial products are then circularly fetched from the memory 21 when computing the other K−1 output samples. This means that only P out of PK multiplications will be completely implemented while the others are only partially implemented. All the arrays of adders 2 may be halted or switched to another task as soon as potential partial products for all the filter coefficients will be stored in the memory 21. Thus, the second strategy is even more advantageous than the first one. However, this strategy is possible only if the adder/subtracters 2 of the first pipeline stage P1 have enough precision to compute potential partial products for the filter coefficients.

Multifunctional Architectures for Video/Image Processing

The structure of the present invention can advantageously be implemented as a multifunctional architecture for video/image processing (MAVIP). FIG. 11 depicts one advantageous embodiment of the video processing structure according to the present invention. This structure is based on the above described embodiments and it utilizes a so called sum-of-absolute-differences (SAD) architecture 24 where the general structure of the SAD architecture is depicted in FIG. 4. It comprises a plurality of p arrays of so called difference-sign (DS) units 25 operating in time-interlaced manner, a compression array 4 with a feedback, and a Final adder 5 followed by a minimum evaluator (M) unit 26 which is needed in motion estimation process (based on SAD) but is not necessary for SAD computation itself. Every array of DS units 25 (DS array or DSA, for short) comprises s DS units 27 (FIG. 5) each of them being, essentially, an 8-bit subtracter followed by XOR gates 28 between the sign bit and the rest of the difference bits. Input to the compression array is formed from s 1-bit numbers (the sign data), s n-bit numbers (difference data, most often n=8), and two (n+log K−1)-bit feedbacks (most often, K=256). The final adder may have (n+log K)-bit precision. An example of the SAD architecture comprises eight DS units (subtracters) and corresponding to the case p=1, s=8, n=8, and K=256, is shown on FIG. 6.

Comparing the SAD structure on FIG. 4 with the multiplier based structures of FIG. 8, and, in particular, an example of FIG. 6 with the structures on FIG. 8 or 9 it can be noticed that there are essential similarities between these two types of structures. Both of these types of structures are, essentially, composed of the block containing a plurality of adders or subtracters 4, 27 (followed by XOR gates in the case of the SAD), the data routing block, which is the Selection block 3 in the case of multiplier based structures and straight connections in the case of the SAD, and the summation block comprising the compression array 4 and the final adder 5. This similarity can be used in order to unify these two types of structures and combine them into a reconfigurable architecture that can be configured to either one of these two structures using a few control signals. This way, further multifunctionality of the architecture may be achieved with a minimum overhead of a simple logic controlled by a few signals.

There are several alternatives to combine the SAD structure with the multiplier-based structures. FIG. 11 presents one of these alternatives for the general structure of the multifunctional architecture for video/image processing. This architecture is derived by simple modifications in every block of the basic multiplier based structure. In this case, the basic structure is the architecture for matrix-vector arithmetic of FIG. 8. FIG. 13 illustrates an example realization of a multifunctional architecture for video/image processing derived from the architecture for matrix-vector arithmetic of FIG. 9.

In one realization, the multifunctional architecture for video/image processing involves arrays of adders 2 which, depending on the first control signal $c_1$ and the fifth control signal $c_5$, can be configured either as adder/subtracters or as DS units and, hence are denoted as AA/DSA. A possible realization of an AA/DSA unit in the general case is schematically shown in FIG. 12. Every m-bit adder/subtracter of the array is composed of r consecutive (m/r)-bit adders/subtracters followed by XOR gates (on FIG. 13, m=16, r=2). The XOR gates are only active in the case $c_1 \bar{c}_5 = 1$; that is the case $(c_1, c_5) = (1,0)$ when the architecture operates as the SAD architecture. On the other hand, the carry propagation between r consecutive (m/r)-bit adders/subtracters is provided only if. The combination of the first control signal $c_1$ and the fifth control signal $c_5$ is also used to control whether different inputs ($c_1 c_5 = 0$) (addends or SAD operands) or one input ($c_1 c_5 = 1$) (multiplicand) enter to the array. Whether addition or subtraction is implemented is controlled by the signal $c_{in}$ which depends on the multiplication method and on the position of the considered m-bit adder/subtracter within the AA/DSA unit. Thus, depending on the control signals $c_1$ and $c_5$, the AA/DSA unit may be configured to operate in different modes as follows.

| $(c_1, c_5)$ | Operating mode of the AA/DSA | Input | Output | Target usage |
|---|---|---|---|---|
| (0,0) | rs parallel (m/r)-bit additions/subtractions | rs (m/r)-bit pairs $(x_i, y_i)$, l=1, ..., r | rs (m/r+1)-bit sums $c_i = x_i + y_i$, | Parallel adder/subtracter |
| (0,1) | s parallel m-bit additions/subtractions | rs (m/r)-bit pairs $(x_i, y_i)$, i=1, ..., r | rs (m/r+1)-bit differences $c_i = x_i - y_i$, | |
| (1,0) | rs (m/r)-bit parallel subtractions then XORs | rs (m/r)-bit pairs $(x_i, y_i)$, i=1, ..., r | rs (m/r)-bit difference data, and rs 1-bit data | First stage (plurality of DS units) of the SAD architecture |

-continued

| ($c_1$,$c_5$) | Operating mode of the AA/DSA | Input | Output | Target usage |
|---|---|---|---|---|
| (1,1) | s additions or subtractions according to radix-T multiplication algorithm | One (m-t)-bit multiplicand x (t=logT) | s m-bit partial products, and rs 1-bit zeros | First stage (AA) of a radix-T multiplier |

In the considered embodiment of the MAVIP on FIG. 11 there is a data routing block between the block of AA/DSA units and the block of compression arrays which is now controlled by the same signals $c_1$ and $c_5$ as the AA/DSA units. The clock signal (not shown) to the selection blocks is combined with the signal $c_1$ by an AND gate so that selection blocks are halted when $c_1$=0. The architecture operates as a parallel array of adders/subtracters in this case. Depending on the control signal $c_5$, the data routing block is either configured to direct connections as within the SAD architecture (if $c_5$=0) directly sending the r (m/r)-bit difference data and r 1-bit data to the block of compression arrays from the outputs of AA/DSA units or operates as a standard selection block within the corresponding multiplier structure (if $c_5$=1) sending the s m-bit partial products to the block of compression arrays either from the block of AA/DSA units or from the memory. This is achieved by inserting a data unifier/multiplexer block 23 that selects the data from the corresponding line. The data unifier/multiplexer block 23 selects the output of the block of AA/DSA units if $c_5$=0 or the output of the selection block if $c_5$=1 and converts the data type to the one suitable for the compression array 4. For example, the input to the compression array within the example on FIG. 13 consists of two groups each consisting five 25-bit numbers and two 31-bit feedback loops. The set of inputs within each group corresponds to the set of partial products in the multiplication method after shifts. Therefore, the unifier/multiplexer block 23 does not make any conversions of the partial products but just implements the corresponding shifts and sends the two sets of partial products to the block compression arrays if $c_5$=. However, when SAD is implemented ($c_5$=0), the unifier/multiplexer block 23 converts the eight 8-bit and eight 1-bit difference and sign data before sending it to the block of compression arrays. The eight 1-bit data are compressed into two 2-bit numbers within a small compression array and then are complemented with zeros (at the MSB side) to become 25-bit numbers. Also the eight 8-bit numbers are complemented with zeros to become 25-bit numbers. The resulting ten 25-bit numbers are then grouped by five numbers.

Modifications to the summation blocks 4 within the architecture on FIG. 11 compared to the architecture for matrix-vector arithmetic of FIG. 8 are needed in order to make it configurable depending on the signals $c_1$ and $c_5$. First of all, the summation block 4 is halted if ($c_1$,$c_2$)=(0,1) so that the architecture operates as a parallel adder/subtracter in this case. However, if ($c_1$,$c_2$)=(0,0) the summation block 4 operates as an accumulator getting data directly from the input bus 6 so that the architecture is in fact split into two parts, the first part operating as a parallel array of adders/subtracters and the second part operating as an accumulator. If ($c_1$,$c_2$)=(1,1) and $c_5$=0 then the summation block 4 is configured to the one for the SAD architecture, at every operating step accepting and accumulating the rs (m/r)-bit difference data and rs 1-bit data from the block of AA/DSA units preliminarily converted by data unifier/multiplexer block 23. In the case ($c_1$,$c_2$)=(1,1) and $c_5$=1 the summation block 4 is configured to the one for the basic multiplier based structure (e.g. to the summation block of the architecture for matrix-vector arithmetic of FIG. 8), which at every operating step accepts s m-bit partial products, and sums up or accumulates the partial products with proper shifts implemented within the data unifier/multiplexer block. There are many ways for designing such a reconfigurable summation block. The example on FIG. 13 uses two summation blocks (compression arrays) followed by the third summation block (the final adder) as in the example of FIG. 9.

FIG. 13 presents an advantageous embodiment of the multifunctional architecture for video/image processing derived from the architecture for matrix-vector arithmetic of FIG. 9 for the case of (n=m=13)-bit multiplicand and multiplier. The architecture in this realization comprises a reconfigurable array of eight 8-bit or four 16-bit adders/subtracters 2, a memory unit 21 for storing the results from adders/subtracters 2, a configurable data routing block 3, a summation block 4 which may also operate as two separate summation/accumulation blocks, and an output multiplexer 20 selecting the correct output. The architecture is controlled by seven control signals $c_1$, . . . , $c_7$. The clock signal (not shown) of the architecture is combined with the signals $c_1$ and $c_2$ through AND gates to halt some blocks of the architecture depending on the operation implemented. For example, only array of adders/subtracters and the output multiplexer are functional when ($c_1$,$c_2$)=(0,1). In this case the architecture simply operates as a parallel array of adders/subtracters. When $c_1$=1, all the blocks are functional but the data routing block is configured either to direct connections for the SAD implementation or to the data routing block of the multiplier based structure depending on whether $c_5$=0 or $c_5$=1, respectively. Also different parts of the compression array are operating depending on $c_5$. This way, the architecture is configured either to the SAD architecture (if $c_1$=1 and $c_5$=0) or to a multiplier-based structure (if $c_1$=1 and $c_5$=1) depending on the signal $c_5$. In turn, when $c_1$=$c_5$=1 the multiplier-based structure is reconfigured to either one of its possible configurations depending on the signals $c_3$, . . . , $c_7$ similarly to as was discussed above in this description. In addition, the summation block may be configured to two separate blocks (if $c_6$=1) giving opportunity to implement a pair of multiplications at once or to a single one (if $c_6$=0) for faster accumulating of a larger number of partial results.

Table 3 lists some operations that may be implemented on the example realization of the MAVIP of FIG. 13 along with corresponding selection of control signals $c_1$, . . . , $c_7$.

TABLE 3

| | Cont. signals | | | | | | |
|---|---|---|---|---|---|---|---|
| Operation | $c_1$ | $c_2$ | $c_3$ | $c_4$ | $c_5$ | $c_6$ | $c_7$ |
| Parallel 8-bit additions/Subtractions | 0 | x | x | x | 0 | 1 | 1 |
| SAD | 1 | x | x | x | 0 | 0 | 1 |
| Pair of 13-bit multiplications | 1 | x | 0 | 0 | 1 | 1 | 0 |
| (kx1) to (1xk) 13-bit vector-vector inner product (k<65) | 1 | 0 | 0 | 1 | 1 | 0 | 1 |
| | | | (no memory in use) | | | | |
| (kx1) to (1xk) 13-bit vector-vector inner product (k<65) | 1 | 1 | 1 | 1 | 1 | 0 | 0 |
| | | | (memory in use) | | | | |
| (pxk) to (kx1) 13 bit matrix-vector product (k<65) | 1 | $c_2$ | $c_3$ | 1 | 1 | 0 | 0 |
| | | $c_2$=$c_3$=0 first (k/2) cycles and $c_2$=$c_3$=1 after that | | | | | |
| k-tap FIR filtering of the signal of length p. | 1 | $c_2$ | $c_3$ | 1 | 1 | 0 | 0 |
| | | $c_2$=$c_3$=0 first (k/2) cycles and $c_2$=$c_3$=1 after that | | | | | |

There are many alternatives of implementing the above described embodiments of the invention since a number of different extensions of different types of multiplier/MAC unit structures can be applied. In addition, different choices of design parameters in every structure lead to different alternatives.

The advantageous embodiments of the present invention can be applied as, for example, stand-alone (tightly or loosely coupled) devices. An alternative implementation of the invention can be a functional unit within a processor of a system. This kind of arrangement can replace a multiplication unit within the processor. There are many other alternatives how this can be done. One of them can be an implementation where only a part of one of the different embodiments without including the plurality of arrays of adders (the first pipeline stage P1) and without including a memory 21 is used as a Functional Unit within the processor. The adders/subtracters of the processor will then play the role of the plurality of arrays of adders while the registers will play the role of the memory used in the structure for matrix-vector operations.

For example, Texas Instruments TMS320C64x DSP includes eight functional units where six of them can operate as 64-bit adders/subtracters, each of them being able to operate as either two 32-bit or four 16-bit, or eight 8-bit ones. It also includes 128 64-bit registers each of which may, similarly, be used as either two 32-bit or four 16-bit or eight 8-bit ones. Supposing that another functional unit (FU) similar to the one on FIG. 6 but without the array of adders will be included into the processor. Then this functional unit comprises a plurality of selection blocks, a plurality of compression arrays and a plurality of fast final adders could be used for multiplication and multiplication based operations in the following two cycles (multiplication on the existing TMS320C64x multiplier also takes two cycles). At the first cycle adders/subtracters compute the potential partial products of the multiplicand x and store the results into registers. At the next step, the proper set of the partial products will be selected and summed up with the considered functional unit. In such cases where the multiplicand x is reused the first cycle may be executed only once when implementing the first multiplication where a is involved, while it may be omitted in subsequent multiplications with a leading to significant savings in time and power consumption. In addition, when implementing FIR filtering (convolution) with a reasonably small number of coefficients, adder/subtracters of the TMS320C64x will be used only in several (maybe one) cycles in the beginning in order to compute the potential partial products for the filter coefficients and store them into registers. Then, the rest of computations will be performed with the functional unit according to the invention and the load/store unit giving an opportunity to use the adders/subtracters for other purposes (or halting them for power saving). In the current implementation of FIR filtering on TMS320C64x all the Functional Units including the multiplier and the adders/subtracters would be busy with that task.

Yet another alternative is the possibility of implementing the advantageous structures of the invention for various bit precisions. For instance, it is possible to implement multipliers/MAC units that can perform either one n×n multiplication, two (n/2)×m or n×(m/2) multiplications, or four (n/2)×(m/2) multiplications in one operating step.

FIG. 14 depicts a device 29 according to an advantageous embodiment of the present invention. It comprises a control unit 30 for controlling the operations of the device 29. The device also comprises a processing unit 31 for performing other processing tasks e.g. signal processing. The calculation device 1 according to an advantageous embodiment of the present invention is preferably implemented in the processing unit 31. The processing unit can also comprise advantageously shared memory 40 for use of both the calculation device and the control unit 30, and internal memory 41 for internal use of the processing unit 31, for example to store the potential partial products. The user interface 33 of the device comprises display means 34, audio means 35, a keyboard 36, and e.g. a video camera 37. The device 29 comprises communication means 38 such as mobile communication means, to communicate with a communication network (not shown) and to exchange information with another device (not shown) known as such. The memory means 39 are used to store different kind of data and programs, such as operating commands for the control unit 30.

The present invention is not limited solely to the above described embodiments, but it can be modified within the scope of the appended claims.

The invention claimed is:

1. Method comprising
    inputting data to a pipelined calculation device comprising a group of at least two pipeline stages for performing a first calculation operation and other calculation operations,
    outputting data of at least one pipeline stage,
    said first calculation operation comprising
    storing the calculation results of the first calculation operation into a memory,
    controlling the memory by a control signal to set the memory open for writing when storing the calculation results of the first calculation operation into the memory, and
    said other calculation operations comprising
    using the stored data as input data to a pipeline stage with a multiple of other calculation operations, and
    controlling the memory by the control signal to set the memory closed for writing when the multiple of said other calculation operations are being performed,
    the method further comprising selecting an input data interface to a pipeline stage from at least a first output data interface and a second output data interface, the first output data interface being an output of a previous pipeline stage.

2. A method according to claim 1 comprising using a high-radix non-Booth recoded multiplication method in said first and other calculation operations.

3. A method according to claim 1, wherein the first calculation operation further comprises
    multiplying a multiplicand by a multiplier, and
    performing a calculation of potential partial products.

4. A method according to claim 1, wherein the first calculation operation further comprises multiplying one multiplicand x with a number of multipliers to compute potential partial products of the common multiplicand when multiplying it by a first multiplier $a_1$.

5. A method according to claim 4, wherein the calculation operations are performed at least partly in a time-interlaced manner by dividing at least one calculation operation into partial calculation operations, and initiating each partial calculation operation at a different time.

6. A method according to claim 1, wherein it is used in connection with processing of video information.

7. A method according to claim 1 comprising
    using one multiplication operation as said first calculation operation,
    using another multiplication operation as said other calculation operation,
    performing said one multiplication operation and said another multiplication operation in a pipelined manner, wherein the method further comprises starting said another multiplication operation before said one multiplication operation is finished, dividing said one multiplication operation and said another multiplication operation into at least a first and a second sub operation, carrying out each of said first and second sub operations in one pipeline stage, and performing at least one of said sub operations in parallel in one pipeline, comprising starting a sub operation for the other multiplication operation before the corresponding sub operation for the first multiplication operation is finished.

8. A method according to claim 1 comprising selecting an input data interface of said pipeline stages;

connecting at least one output data interface of said pipeline stages to said selected input data interface for routing data between said at least one output data interface and said selected input data interface.

9. System in a pipelined calculation device comprising:

at least one input data interface for input of data for a first calculation operation and other calculation operations, and at least one output data interface for output of data, at least two pipeline stages, a memory for storing output data of said first calculation operation, a control signal to set the memory open or closed for writing, and a data retriever for using the output data stored in the memory in said other calculation operation as input data to a pipeline stage, and at least one multiplexer for selecting an input data interface to a pipeline stage from at least a first output data interface and a second output data interface, the first output data interface being an output of a previous pipeline stage, wherein the system is configured to use the output data stored in the memory with a multiple of said other calculation operations, and to control the memory by the control signal to set the memory open for writing when storing the calculation results of the first calculation operation into the memory, and to set the memory closed for writing when performing the multiple of said other calculation operations.

10. A system according to claim 9, wherein the calculation device is a High-radix non-Booth recoded multiplier.

11. A system according to claim 9, wherein the data retriever comprises a multiplexer to connect the output of the memory to an input data interface of at least one of said other pipeline stages for using the stored calculation results with said multiple of other calculation operations.

12. A system according to claim 9, a first pipeline stage including arrays of adders, a second pipeline stage including selection blocks, a third pipeline stage including compression arrays, and a fourth pipeline stage including carry-look-ahead adders, that an output data interface of the first pipeline stage is connected to the input of the memory and to one input of the data retriever, the output of the memory is connected to another input of the data retriever, and the output of the data retriever is connected to an input data interface of the second pipeline stage.

13. A system according to claim 9, the memory comprising a multiple of registers each register being configured to store one value, and an addressing unit for addressing one of the registers at a time for reading/writing data from/to the register.

14. A system according to claim 9, the memory comprising a multiple of registers each register being configured to store one value, a multiplexer for selecting either the input of the memory or an output of one of the registers for storing the value of a selected source into the first register, and that the output of the first register is connected to the output of the memory.

15. A system according to claim 9, including means for processing video information.

16. Device comprising at least one data interface for input of data for a first calculation operation and other calculation operations, at least one data interface for output of data, a group of at least two pipeline stages, a memory for storing output data of said first calculation operation, a control signal to set the memory open or closed for writing, and a data retriever for using the stored data in said other calculation operation as input data to a pipeline stage, and at least one multiplexer for selecting an input data interface to a pipeline stage from at least a first output data interface and a second output data interface, the first output data interface being an output of a previous pipeline stage, wherein the device is configured to use the output data stored in the memory with a multiple of said other calculation operations, and to control the memory by the control signal to set the memory open for writing when storing the calculation results of the first calculation operation into the memory, and to set the memory closed for writing when performing the multiple of said other calculation operations.

17. A device according to claim 16, wherein it is a High-radix non-Booth recoded multiplier.

18. A device according to claim 16, wherein the data retriever comprises a multiplexer to connect the output of the memory to an input data interface of at least one of said other pipeline stages for using the stored calculation results with said multiple of other calculation operations.

19. A device according to claim 16, the first pipeline stage including arrays of adders, the second pipeline stage including selection blocks, a third pipeline stage including compression arrays, and a fourth pipeline stage including carry-look-ahead adders, an output data interface of the first pipeline stage connected to an input of the memory and to one input of the data retriever, an output of the memory connected to another input of the data retriever, and an output of the data retriever connected to an input data interface of the second pipeline stage.

20. A device according to claim 16, the memory comprising a multiple of registers each register configured to store one value, and an addressing unit for addressing one of the registers at a time for reading/writing data from/to the register.

21. A device according to claim 16, the memory comprising a multiple of registers each register configured to store one value, a multiplexer for selecting either an input of the memory or an output of one of the registers for storing a value of a selected source into a first register, an output of the first register connected to an output of the memory.

22. A device according to claim 16, including means for processing video information.

23. A device according to claim 16, wherein the device includes pipeline registers at an input data interface of at least one pipeline stage, at least one multiplexer at an output of said at least one pipeline stage, and control inputs for controlling said pipeline registers such that only one of the pipeline registers are open at a time for writing data to the input data interface of said pipeline stage, said multiplication operations divided into at least a first and a second sub operation, each of said first and second sub operation carried out in one pipeline stage, and at least one of said sub operations performed in parallel in one pipeline, a sub operation for another multiplication operation started before a corresponding sub operation for a first multiplication operation is finished.

24. A device according to claim 16, including selection means for performing a selective data routing, said selection means comprising means for connecting a data interface to another data interface among at least two other data interfaces for routing data between the connected data interfaces.

25. A device according to claim 16, a first pipeline stage of said at least two pipeline stages comprising a first group of input registers for inputting a multiplicand, and a second pipeline stage of said at least two pipeline stages comprising a second group of input registers for inputting a multiplier, and
said device is configured to use said multiplicand in said first calculation operation,
and said multiplier in said other calculation operations.

26. A device according to claim 16, comprising a first and a second selection block, said first selection block comprising a first control input to control the operation of the first selection block by a first multiplier, and said second selection block comprising a second control input to control the operation of the second selection block by a second multiplier.

27. A device according to claim 26, comprising a multiplexer for selecting potential partial products of a same multiplicand or potential partial products of two different multiplicands to be input to said first and second selection block.

28. Mobile communication device having a pipelined calculation device comprising
at least one data interface for input of data for a first calculation operation and other calculation operations,
at least one data interface for output of data,
a group of at least two pipeline stages,
a memory for storing output data of said first calculation operation,
a control signal to set the memory open or closed for writing, and
a data retriever for using the stored data in said other calculation operations as input data to a pipeline stage, and
at least one multiplexer for selecting an input data interface to a pipeline stage from at least a first output data interface and a second output data interface, the first output data interface being an output of a previous pipeline stage,
wherein the device is configured to use the output data stored in the memory with a multiple of said other calculation operations, and to control the memory by the control signal to set the memory open for writing when storing the calculation results of the first calculation operation into the memory, and to set the memory closed for writing when performing the multiple of said other calculation operations.

29. Integrated circuit comprising
at least one data interface for input of data, at least one data interface for output of data,
a group of at least two pipeline stages,
a memory for storing output data in a first calculation operation,
a control signal to set the memory open or closed for writing, and
a data retriever for using the stored data in other calculation operations as input data to a pipeline stage, and
at least one multiplexer for selecting an input data interface to a pipeline stage from at least a first output data interface and a second output data interface, the first output data interface being an output of a previous pipeline stage,
wherein the integrated circuit is configured to store calculation results of the first calculation operation into the memory, and to use the stored calculation results with a multiple of said other calculation operations, and to control the memory by the control signal to set the memory open for writing when storing the calculation results of the first calculation operation into the memory, and to set the memory closed for writing when performing the multiple of said other calculation operations.

30. Computing device comprising
at least one data interface for input of data, at least one data interface for output of data,
a group of at least two pipeline stages,
a memory for storing output data of a first calculation operation,
a control signal to set the memory open or closed for writing, and
a data retriever for using the stored data in other calculation operations as input data to a pipeline stage and
at least one multiplexer for selecting an input data interface to a pipeline stage from at least a first output data interface and a second output data interface, the first output data interface being an output of a previous pipeline stage,
wherein the computing device is configured to use the output data stored in the memory with a multiple of said other calculation operations, and to control the memory by the control signal to set the memory open for writing when storing the calculation results of the first calculation operation into the memory, and to set the memory closed for writing when performing the multiple of said other calculation operations.

* * * * *

UNITED STATES PATENT AND TRADEMARK OFFICE
CERTIFICATE OF CORRECTION

PATENT NO.         : 7,536,430 B2
APPLICATION NO.    : 10/703161
DATED              : May 19, 2009
INVENTOR(S)        : Guevorkian et al.

Page 1 of 1

It is certified that error appears in the above-identified patent and that said Letters Patent is hereby corrected as shown below:

1. On the Title page at INID (12) and again at INID (75), "Guevokian" should be --Guevorkian--.

Signed and Sealed this

Twenty-second Day of September, 2009

David J. Kappos
*Director of the United States Patent and Trademark Office*